(12) United States Patent
Jensen et al.

(10) Patent No.: US 8,883,235 B2
(45) Date of Patent: Nov. 11, 2014

(54) INGREDIENT DELIVERY SYSTEM FOR POPCORN KERNELS

(75) Inventors: Michael Laurence Jensen, Omaha, NE (US); James Wesley Belleson, Lewisburg, PA (US); Tyler S. Wright, Kalamazoo, MI (US)

(73) Assignee: ConAgra Foods RDM, Inc., Omaha, NE (US)

( * ) Notice: Subject to any disclaimer, the term of this patent is extended or adjusted under 35 U.S.C. 154(b) by 175 days.

(21) Appl. No.: 13/033,192

(22) Filed: Feb. 23, 2011

(65) Prior Publication Data

US 2012/0213892 A1    Aug. 23, 2012

(51) Int. Cl.
  *A23L 1/36*   (2006.01)
  *B65D 81/34*  (2006.01)
  *A23L 1/18*   (2006.01)

(52) U.S. Cl.
  CPC .............. *B65D 81/3469* (2013.01); *A23L 1/18* (2013.01); *B65D 2581/3421* (2013.01); *B65D 2581/3494* (2013.01)
  USPC .......................................................... 426/93

(58) Field of Classification Search
  USPC .......................................................... 426/93
  See application file for complete search history.

(56) References Cited

U.S. PATENT DOCUMENTS

| | | | |
|---|---|---|---|
| 1,658,486 A | 2/1928 | Howe | |
| 1,969,730 A | 8/1934 | Daughters | 99/8 |
| 2,222,560 A | 11/1940 | Clickner | 99/134 |
| 2,240,759 A | 5/1941 | Chandler | 99/166 |
| 2,475,133 A | 9/1949 | Furter et al. | 99/11 |
| 2,518,247 A | 8/1950 | Nairn | 426/251 |
| 2,604,407 A | 9/1952 | Martin | 99/153 |
| 2,648,610 A | 8/1953 | Martin | 99/171 |
| 2,673,806 A | 3/1954 | Colman | 99/171 |
| 2,702,246 A | 2/1955 | Kinsella | 99/81 |
| 2,843,080 A | 7/1958 | Woodruff | 118/16 |
| 3,102,032 A | 8/1963 | Lippert | 99/80 |
| 3,140,952 A | 7/1964 | Cretors | 99/81 |
| 3,341,331 A | 9/1967 | Kimura et al. | 96/55 |
| 3,341,336 A | 9/1967 | Jokay | 99/199 |
| 3,537,861 A | 11/1970 | Schwarzkopf | 99/83 |
| 3,556,815 A | 1/1971 | Fujiwara | 99/171 |

(Continued)

FOREIGN PATENT DOCUMENTS

| | | | | |
|---|---|---|---|---|
| EP | 0 217 368 A2 | 4/1987 | | A23L 1/18 |
| EP | 1 183 953 A2 | 3/2002 | | A23L 1/18 |

(Continued)

OTHER PUBLICATIONS

Anonymous, *Food Technology*, "Edible Films Solve Problems", vol. 51, No. 2, Feb. 1997, 1 pg.

(Continued)

*Primary Examiner* — D. Lawrence Tarazano
*Assistant Examiner* — Katherine D Leblanc
(74) *Attorney, Agent, or Firm* — Ryan T. Grace; Advent, LLP

(57) ABSTRACT

An ingredient delivery system for popcorn kernels is described. The ingredient delivery system can include multiple layers. The synergy formed from the multiple layers of the ingredient delivery system results in a popped popcorn with minimal flaking and blow-off. Thus, a greater ingredient impact is imparted to the consumer. Also, the layer combination minimizes any hindrance of the natural popping action of the kernels. Thus, consumers have a greater pop volume for consumption.

16 Claims, 7 Drawing Sheets

(56) References Cited

U.S. PATENT DOCUMENTS

| | | | |
|---|---|---|---|
| 3,580,727 A | 5/1971 | Gulstad | 99/81 |
| 3,617,309 A | 11/1971 | Rebane | 99/138 R |
| 3,689,291 A | 9/1972 | Draper | 99/177 |
| 3,695,894 A | 10/1972 | Hum | 99/134 R |
| 3,704,133 A | 11/1972 | Kracauer | 99/83 |
| 3,764,346 A | 10/1973 | Noznick | 426/213 |
| 3,783,820 A | 1/1974 | Hautly et al. | 118/19 |
| 3,830,941 A | 8/1974 | Luff et al. | 426/309 |
| 3,843,814 A | 10/1974 | Grunewald-Kirstein | 426/307 |
| 3,851,081 A | 11/1974 | Epstein | 426/343 |
| 3,851,574 A | 12/1974 | Katz et al. | 426/107 |
| 3,882,255 A | 5/1975 | Gorham, Jr. et al. | 426/235 |
| 3,961,091 A | 6/1976 | Caccavale et al. | 426/307 |
| 3,973,045 A | 8/1976 | Brandberg et al. | 426/110 |
| 4,038,425 A | 7/1977 | Brandberg et al. | 426/107 |
| 4,053,650 A | 10/1977 | Chino et al. | 426/304 |
| 4,096,281 A | 6/1978 | Young et al. | 426/89 |
| 4,156,742 A | 5/1979 | Babcock et al. | 426/618 |
| 4,163,066 A | 7/1979 | Mason et al. | 426/99 |
| 4,219,573 A | 8/1980 | Borek | 426/107 |
| 4,409,250 A | 10/1983 | Van Hulle et al. | 426/242 |
| 4,450,180 A | 5/1984 | Watkins | 426/107 |
| 4,548,826 A | 10/1985 | Watkins | 426/394 |
| 4,563,366 A | 1/1986 | Baird et al. | 426/573 |
| 4,563,561 A | 1/1986 | Vaeth et al. | 219/10.55 E |
| 4,584,201 A | 4/1986 | Boston | 426/106 |
| 4,596,713 A | 6/1986 | Burdette | 426/107 |
| 4,622,799 A | 11/1986 | Boston | 53/415 |
| 4,640,842 A | 2/1987 | May | 426/534 |
| 4,691,374 A | 9/1987 | Watkins et al. | 383/104 |
| 4,735,811 A | 4/1988 | Skarra et al. | 426/128 |
| 4,751,090 A | 6/1988 | Belleson et al. | 426/93 |
| 4,767,635 A | 8/1988 | Merritt et al. | 426/272 |
| 4,849,233 A | 7/1989 | Hemker | 426/93 |
| 4,851,246 A | 7/1989 | Maxwell et al. | 426/107 |
| 4,880,646 A | 11/1989 | Lew et al. | 426/93 |
| 4,888,186 A | 12/1989 | Cooley et al. | 426/99 |
| 4,892,744 A | 1/1990 | Ylvisaker | 426/111 |
| 4,900,573 A * | 2/1990 | Meyers et al. | 426/302 |
| 4,904,487 A | 2/1990 | LaBaw | 426/107 |
| 4,904,488 A | 2/1990 | LaBaw | 426/107 |
| 4,927,645 A | 5/1990 | Lee | 426/93 |
| 4,927,648 A | 5/1990 | Ylvisaker | 426/234 |
| 4,956,193 A | 9/1990 | Cain et al. | 426/573 |
| 4,959,231 A * | 9/1990 | Lakey et al. | 426/111 |
| 4,981,707 A | 1/1991 | Morris | 426/93 |
| 5,002,785 A | 3/1991 | Lew | 426/303 |
| 5,008,024 A | 4/1991 | Watkins | 219/10.55 |
| 5,035,904 A | 7/1991 | Huang et al. | 426/243 |
| 5,044,777 A | 9/1991 | Watkins et al. | 383/104 |
| 5,069,923 A | 12/1991 | Hubbard et al. | 426/559 |
| 5,075,119 A | 12/1991 | Mendenhall | 426/113 |
| 5,108,770 A | 4/1992 | Domingues et al. | 426/94 |
| 5,108,772 A | 4/1992 | Wilbur | 426/559 |
| 5,132,125 A | 7/1992 | Lew et al. | 426/93 |
| 5,215,770 A | 6/1993 | Aramouni | 426/93 |
| 5,223,289 A | 6/1993 | Domingues et al. | 426/243 |
| 5,284,666 A | 2/1994 | Graf | 426/242 |
| 5,362,504 A | 11/1994 | Kamper et al. | 426/89 |
| 5,419,238 A | 5/1995 | Pinone | 99/323.6 |
| 5,443,858 A | 8/1995 | Jensen et al. | 426/618 |
| 5,585,127 A | 12/1996 | Freeport et al. | 426/93 |
| 5,688,543 A | 11/1997 | Freeport et al. | 426/93 |
| 5,690,979 A | 11/1997 | Bourns et al. | 426/397 |
| 5,747,080 A * | 5/1998 | Lemke et al. | 426/72 |
| 5,750,166 A | 5/1998 | Schellhaass | 426/93 |
| 5,753,287 A | 5/1998 | Chedid et al. | 426/93 |
| 5,773,801 A | 6/1998 | Blamer et al. | 219/727 |
| 5,804,244 A | 9/1998 | Howell et al. | 426/618 |
| 5,897,894 A | 4/1999 | Glass | 426/89 |
| 5,919,505 A | 7/1999 | Monsalve et al. | 426/107 |
| 5,968,572 A | 10/1999 | Behnke et al. | 426/302 |
| 5,993,869 A | 11/1999 | Freeport | 426/107 |
| 5,997,916 A | 12/1999 | Dickerson et al. | 426/74 |
| 6,013,291 A | 1/2000 | Glass et al. | 426/74 |
| 6,083,552 A | 7/2000 | Kershman et al. | 426/559 |
| 6,126,976 A | 10/2000 | Hasse et al. | 426/107 |
| 6,207,205 B1 | 3/2001 | Patel et al. | 426/93 |
| 6,555,147 B1 | 4/2003 | Xu | 426/50 |
| 6,746,700 B1 | 6/2004 | Landon | 426/93 |
| 7,082,891 B2 | 8/2006 | Watson | 118/24 |
| 7,579,036 B2 | 8/2009 | Meamber | 426/618 |
| 2002/0127306 A1 | 9/2002 | Schmidt et al. | 426/107 |
| 2003/0194472 A1 | 10/2003 | Jensen et al. | 426/107 |
| 2004/0197441 A1 | 10/2004 | Teoh | 426/107 |
| 2006/0078655 A1 | 4/2006 | Plank et al. | 426/107 |
| 2006/0088648 A1 | 4/2006 | Teoh et al. | 426/625 |
| 2007/0254073 A1 | 11/2007 | Jensen et al. | 426/107 |
| 2008/0044546 A1 | 2/2008 | Jensen et al. | 426/601 |

FOREIGN PATENT DOCUMENTS

| | | | |
|---|---|---|---|
| WO | WO94/23589 | 10/1994 | A23L 1/18 |
| WO | WO 00/60954 A1 | 10/2000 | |
| WO | WO 01-17371 A1 | 3/2001 | |
| WO | WO02/067694 A2 | 9/2002 | |
| WO | WO03/080465 A1 | 10/2003 | B65D 81/34 |
| WO | WO2008/021526 A2 | 8/2006 | |
| WO | WO2009/089640 A1 | 7/2009 | C07D 317/34 |

OTHER PUBLICATIONS

Author Unknown, *Food Technology*, "Edible and Biodegradable Polymer Films", vol. 51, No. 2, Feb. 1997, 1 pg.

Trezza et al., *Journal of Food Science*, "Grease Resistance of Corn Zein Coated Paper", vol. 59, No. 4, 1994, 4pgs.

Shulka, 1993 *American Association of Cereal Chemists, Inc.*, "Trends in Zein Research and Utilization", vol. 70, No. 2., 1993, 7pgs.

Wu et al., *Cereal Chemistry*, "Popping Behavior and Zein Coating of Popcorn", vol. 69, No. 5, 1992, 7pgs.

International Search Report mailed Jun. 2, 2008, Application No. PCT/US2007009563.

Written Opinion of the International Searching Authority mailed Jun. 2, 2008, Application No. PCT/US2007009563.

Simperler et al. Journal of Physical Chemistry B. University of Cambridge: 2006. Accessed from the World Wide Web at: http://pubs.asc.org/doi/abs/10.1021/jp063134t. 7pgs.

International Search Report and Written Opinion of the International Searching Authority mailed Sep. 26, 2012, Application No. PCT/US2012/026029.

* cited by examiner

INGREDIENT DELIVERY SYSTEM FOR POPCORN KERNELS

BACKGROUND

Ingredients can be applied to a popcorn product in several ways. One way to apply ingredients to a popcorn product is to apply the ingredient from an external source after the popcorn kernels have popped. For example, salt can be sprinkled onto popped popcorn. Ingredients can also be applied to the popcorn while the popcorn is popping. For example, an ingredient can be included in the oil/fat component that facilitates the popping of the kernels. When the popcorn pops, the popped kernels contact the oil/fat component having the ingredient.

Another manner of applying ingredients to a popcorn product includes applying a coating onto the hull of the unpopped kernels. Yet, coatings are typically susceptible to flaking and reduced pop volume. The coatings can flake off the kernels during typical manufacturing and popping processes. The loss can result in a less than adequate ingredient impact for the popcorn product. Coatings can also hinder popping. The decrease in pop volume results in a lower quality product with lower expansion characteristics.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to an ingredient delivery system for popcorn kernels. The ingredient delivery system can include multiple layers. The synergy formed from the multiple layers of the ingredient delivery system result in a popped popcorn with minimal flaking and blow-off Thus, a greater ingredient impact is imparted to the consumer. Also, the layer combination minimizes any hindrance of the natural popping action of the kernels. Thus, consumers have a greater pop volume for consumption.

DRAWINGS

DETAILED DESCRIPTION

Figure 1:
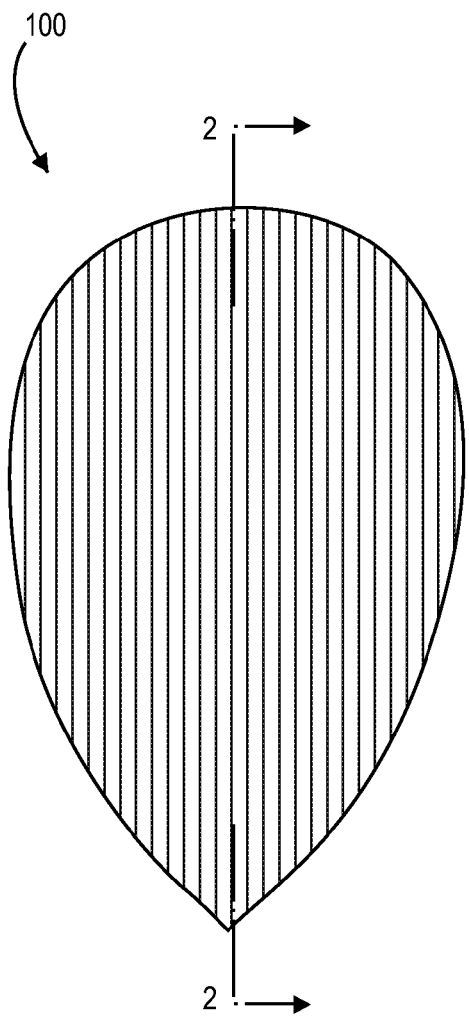
FIG. 1 is a side view of an unpopped popcorn kernel having an ingredient delivery system.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as methods, processes and/or devices. The following detailed description is, therefore, not to be taken in a limiting sense.

Popcorn is a popular consumer item. A package of popcorn can include packaging having unpopped popcorn enclosed therein. In other aspects, a popcorn composition can include unpopped popcorn kernels, oil/fat, flavoring, and/or other ingredients within a package. In other aspects, a microwave susceptor can be provided on or within the package to facilitate collection of microwave energy and heat transfer to the kernels during popping. Such a package can be placed inside a microwave oven and, after exposure to microwave energy, produce an edible form of popped corn.

Many consumers prefer a flavor ingredient for their popcorn. One typical way to provide an ingredient is to add the ingredient in a post-popping step. For example, butter can be added and/or sprayed onto the popped popcorn. Another typical way to provide an ingredient is to include ingredient materials within a popcorn composition before popping. As the popcorn pops, the popcorn is provided with the desired ingredient. For example, a salty taste can be provided by including appropriate levels of a salt ingredient in the popcorn composition. As still another way of applying an ingredient to popcorn, an ingredient can be in the popcorn composition and also applied to the kernels after popping. As such, flavor combinations can be created.

Yet another way of adding ingredients to popcorn includes a coating on the hull of the popcorn kernel. Yet, coatings can increase the coefficient of friction of the kernel and hinder the flowability of the kernels during manufacturing processes. This hindrance caused by the coefficient of friction can cause flaking and coating loss. The flaking and coating loss during manufacturing processes can cause the coating to have a less than desired effect on consumer perception. Also, the energy produced from the explosive popping effect can cause coatings to blow-off the hull. Again, the blow-off during popping can cause the coating to have a less than desired effect on consumer perception. In order to reduce blow-off, coatings can be applied in thick quantities with a strong film forming agent. Yet, such applications can hinder the popping action and result in less pop volume. The decrease in pop volume generally means that there is less volume of popcorn for consumer consumption.

Aspects of the current disclosure are directed to an ingredient delivery system for popcorn kernels. In one aspect, the ingredient delivery system includes multiple layers that synergistically result in greater pop volume and ingredient retention than prior coatings. For example, a priming layer can be formed from a priming solution that includes a film forming component. In one aspect, the priming layer can provide a surface that promotes adhesion of another layer. Also, the priming layer can provide a barrier between the ingredient layer and the hull of the popcorn kernel. An ingredient layer can be formed from an ingredient solution that includes a film forming component and an ingredient component. The ingredient layer can deliver one or more ingredients to cause a desired effect on the consumer. A sealant layer can be formed from a sealant solution that includes a film forming component. The sealant layer can seal the ingredient layer, provide a barrier to the ingredient layer, and provide a low coefficient of friction on the outer surface.

A. INGREDIENT DELIVERY SYSTEM

Figure 2:
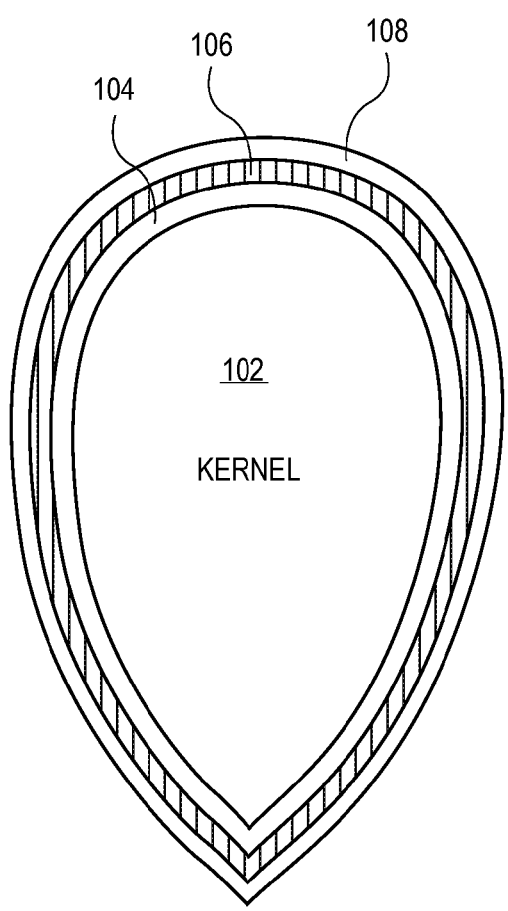
FIG. 2 is a cross section at line 2-2 of an unpopped popcorn kernel having an ingredient delivery system.
Figure 3:
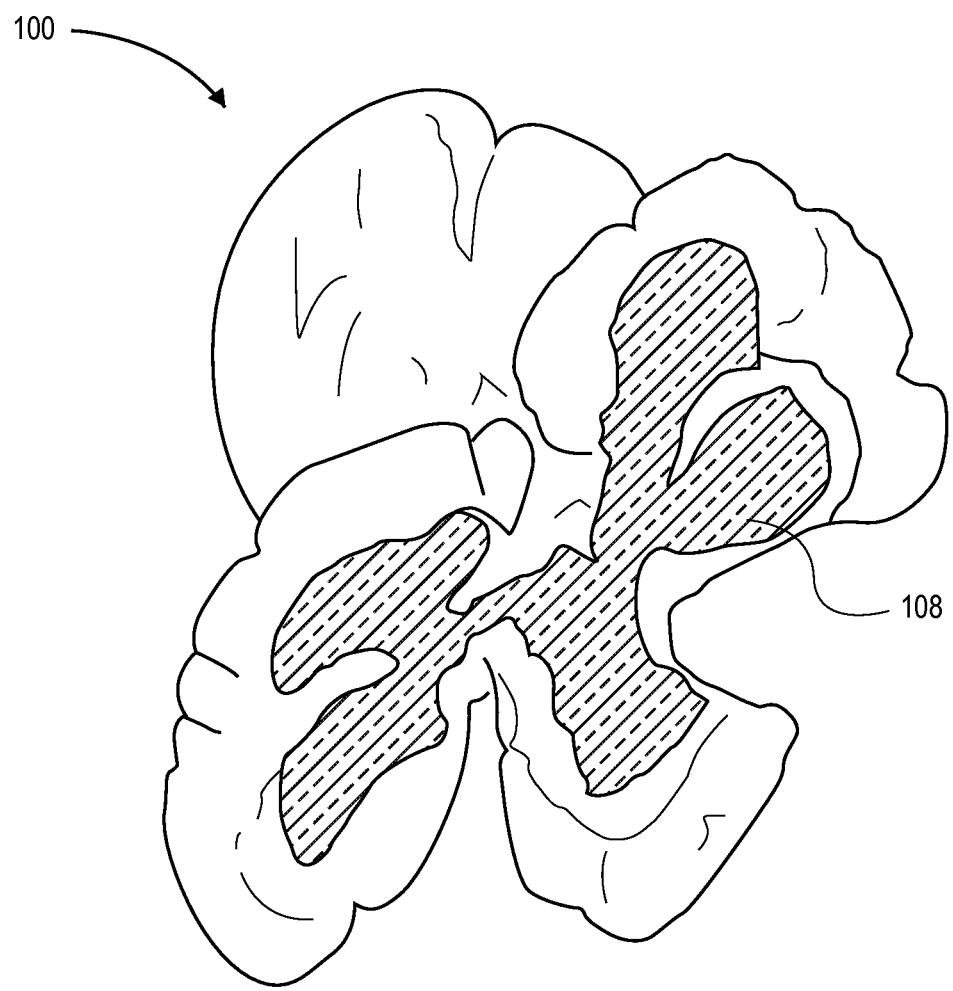
FIG. 3 is a view of a popped popcorn kernel having an ingredient delivery system.

FIGS. 1-3 depict aspects of the ingredient delivery system associated with the disclosure. Ingredient delivery system 100 can include kernel 102, priming layer 104, ingredient layer 106, and sealant layer 108. In one aspect, each layer is a distinct, separately formed layer. Yet, even though layers 104-108 are depicted in an order in FIG. 2, layers 104-108 are not required to be in any particular order. For example, priming layer 104 can be positioned in the order of ingredient layer 106 or sealant layer 108. Also, ingredient layer 106 can be positioned in the order of priming layer 104 or sealant layer 108. Likewise, sealant layer 108 can be positioned in the order of priming layer 104 or ingredient layer 106. A person of skill in the art will recognize that layers 104-108 can be in a plurality of orders depending on a desired synergistic effect of the ingredient delivery system 100. Moreover, even though FIG. 2 indicates three layers, ingredient delivery system 100 can include more than three layers or less than three layers and include the functionality as more fully set forth below. Ingredient delivery system 100 can also comprise a plurality of consecutively stacked ingredient delivery systems 100.

As more fully set forth below and in the Examples, the layers of ingredient delivery system 100 can have a synergistic effect. For example, sealant layer 108 can have a smooth surface texture similar to the hull of a native popcorn kernel. The smooth texture of the sealant layer minimizes abrasive actions during product manufacturing and the sealant layer also acts as a barrier to protect ingredient layer 106 during popping and manufacturing. As another example, priming layer 104 can provide a surface for facilitating the adherence of ingredient layer 106. Priming layer 104 can also provide a barrier between ingredient layer 106 and kernel 102. Such a barrier can mitigate any degrative effect ingredient layer 106 may have on the hull of kernel 102. The synergistic effect in the layers provides a pop volume of about 215 cc (per 76.2 g sample of unpopped corn) greater than prior coatings. Such an increase is about one cup greater pop volume per 76.2 grams of unpopped kernels. Also, blow-off is reduced about 0.5% of the blow off of prior coatings. As a result, the consumer has a greater volume of popcorn for consumption and a significant maintenance of the ingredient layer 106 to maximize the impact of the ingredient on the consumer.

1. Priming Layer

Even though FIG. 2 indicates a priming layer, ingredient delivery system 100 does not require a priming layer 104. Typically, priming layer 104 provides a surface that promotes the adherence of the ingredient layer 106. For example, priming layer 104 can include a surface that is rougher than a typical kernel surface in order to facilitate the adherence of some ingredients. Yet, depending on the type of ingredient and the characteristics of the solution it is used in, the kernel surface can be sufficient to promote adherence of ingredient layer 106. In other aspects, the priming layer 104 can provide a barrier between ingredient layer 106 and the kernel surface. This barrier can be advantageous where, for example, ingredient layer 106 has a reactionary property (e.g., pH) that would have a degenerative effect on the kernel surface. Such degenerative effects can hinder popping and/or reduce pop volume. Priming layer 104 can be formed from a priming solution that can be applied to the kernels in a liquid form. As an example, the priming solution can be applied via a coating and drying operation. In other aspects, the priming solution can be applied via panning, mixing, tumbling, spraying, ladling, and/or immersion. The priming solution can be applied onto the kernels in an amount from about 1% to about 5% by weight of the uncoated kernels. The priming solution can be applied onto the kernels in an amount from about 1.0%, 1.5%, 2.0%, 2.5%, 3.0%, 3.5%, 4.0%, 4.5%, 5.0% to about 1.0%, 1.5%, 2.0%, 2.5%, 3.0%, 3.5%, 4.0%, 4.5%, 5.0% by weight of the uncoated kernels. In one aspect, the kernels can be mixed in the priming solution for about 1 to about 20 minutes depending on product and process variables. For example, the kernels can be mixed in the priming solution for about 1, 2, 3, 4, 5, 6, 7, 8, 9, 10, 11, 12, 13, 14, 15, 16, 17, 18, 19, 20 minutes to about 1, 2, 3, 4, 5, 6, 7, 8, 9, 10, 11, 12, 13, 14, 15, 16, 17, 18, 19, 20 minutes.

The priming solution that forms priming layer 104 can include one or more carbohydrate polymeric film formers. For example, the carbohydrate polymeric film formers can include a cellulose component, a hemi-cellulose component, gums, pectins, starches and/or starch derivatives. In one aspect, the carbohydrate polymeric film former is a cellulose and starch blend. Example cellulose material can include hydroxypropylmethylcelluose. Example hydroxypropylmethylcelluose can include METHOCEL E5 Premium LV Hydroxypropyl Methylcellulose manufactured by The DOW Chemical Company of Midland, Mich. In another aspect, the hydroxypropylmethylcelluose includes METHOCEL E15 Premium LV Hydroxypropyl Methylcellulose manufactured by The DOW Chemical Company of Midland, Mich.

The starch material can include a corn starch and/or a modified corn starch. Yet, several types of starches can be used in the priming solution. The starch can be a cook-up starch from any source. In one aspect the starch material can include PURE-COTE® B790 Corn Starch manufactured by Grain Processing Corporation of Muscatine, Iowa. The modified corn starch can be a flash-dried, low viscosity, modified dent corn starch that provides film-forming and adhesive properties. When the corn starch sets up, it can form a clear, flexible film that dries quickly and flavor free. The starch material can have a moisture content of less than about 12.5%. The starch material can have a pH between about 5.0 and about 7.0. The ash residue in the starch material can be less than about 0.5% and the protein in the starch material can less than about 0.35%.

As stated, the priming solution that forms priming layer 104 can include a combination of cellulose material and starch material. The cellulose material can be from about 1% to about 10% by weight of the priming solution. In other aspects, the cellulose material can be from about 2% to about 4% by weight of the priming solution. The cellulose material can be from about 1%, 2%, 3%, 4%, 5%, 6%, 7%, 8%, 9%, 10% to about 1%, 2%, 3%, 4%, 5%, 6%, 7%, 8%, 9%, 10% by weight of the priming solution. The priming solution can include about 1% to about 12% by weight of the starch material. In other aspects, the priming solution can include about 5% to about 10% by weight of the starch material. The priming solution can include about 1%, 2%, 3%, 4%, 5%, 6%, 7%, 8%, 9%, 10%, 11%, 12% to about 1%, 2%, 3%, 4%, 5%, 6%, 7%, 8%, 9%, 10%, 11%, 12% by weight of the starch material. The priming solution can include from about 78% to about 98% by weight of water. In other aspects, the priming solution includes about 86% to about 93% by weight of water. The priming solution can include 78%, 79%, 80%, 81%, 82%, 83%, 84%, 85%, 86%, 87%, 88%, 89%, 90%, 91%, 92%, 93%, 94%, 95%, 96%, 97%, 98% to about 78%, 79%, 80%, 81%, 82%, 83%, 84%, 85%, 86%, 87%, 88%, 89%, 90%, 91%, 92%, 93%, 94%, 95%, 96%, 97%, 98% by weight water.

The priming solution can have a density of about 1.018 g/cm$^3$. In other aspects, the priming solution can have a density from about 0.900 g/cm$^3$ to about 1.100 g/cm$^3$. The density of the priming solution can be from about 0.900 g/cm$^3$, 0.910 g/cm$^3$, 0.920 g/cm$^3$, 0.930 g/cm$^3$, 0.940 g/cm$^3$, 0.950 g/cm$^3$, 0.960 g/cm$^3$, 0.970 g/cm$^3$, 0.980 g/cm$^3$, 0.990 g/cm$^3$, 1.000 g/cm$^3$, 1.010 g/cm$^3$, 1.020 g/cm$^3$, 1.030 g/cm$^3$, 1.040 g/cm$^3$, 1.050 g/cm$^3$, 1.060 g/cm$^3$, 1.070 g/cm$^3$, 1.080 g/cm³, 1.090 g/cm³, 1.100 g/cm³ to about 0.900 g/cm³, 0.910 g/cm³, 0.920 g/cm³, 0.930 g/cm³, 0.940 g/cm³, 0.950 g/cm³, 0.960 g/cm³, 0.970 g/cm³, 0.980 g/cm³, 0.990 g/cm³, 1.000 g/cm³, 1.010 g/cm³, 1.020 g/cm³, 1.030 g/cm³, 1.040 g/cm³, 1.050 g/cm³, 1.060 g/cm³, 1.070 g/cm³, 1.080 g/cm³, 1.090 g/cm³, 1.100 g/cm³.

The priming solution can have a viscosity of about 100 cP at 68° F. In other aspects, the priming solution can have a viscosity from about 90 cP at 68° F. to about 110 cP at 68° F. At 68° F., the priming solution can have a viscosity from about 90 cP, 91 cP, 92 cP, 93 cP, 94 cP, 95 cP, 96 cP, 97 cP, 98 cP, 99 cP, 100 cP, 101 cP, 102 cP, 103 cP, 104 cP, 105 cP, 106 cP, 107 cP, 108 cP, 109 cP, 110 cP to about 90 cP, 91 cP, 92 cP, 93 cP, 94 cP, 95 cP, 96 cP, 97 cP, 98 cP, 99 cP, 100 cP, 101 cP, 102 cP, 103 cP, 104 cP, 105 cP, 106 cP, 107 cP, 108 cP, 109 cP, 110 cP.

The priming solution can have a pH of about 7.0. In other aspects, the priming solution can have a pH from about 6.5 to about 7.5. The pH can be from about 6.5, 6.6, 6.7, 6.8, 6.9, 7.0, 7.1, 7.2, 7.3, 7.4, 7.5 to about 6.5, 6.6, 6.7, 6.8, 6.9, 7.0, 7.1, 7.2, 7.3, 7.4, 7.5.

After application of the priming solution and the setting of the priming solution on the kernel, priming layer 104 can have a thickness 1 μm to 20 μm. In other aspects, priming layer 104 can have a thickness from about 5 μm to about 10 μm. The thickness can be about 1 μm, 2 μm, 3 μm, 4 μm 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm to about 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm.

2. Ingredient Layer

Ingredient layer 106 can be formed between priming layer 104 and sealant layer 108. Yet as indicated above, ingredient layer 106 can be formed in the position of priming layer 104 or sealant layer 108. Ingredient layer 106 can carry the ingredient for the ingredient delivery system 100. For example, the ingredient can include a flavor component, a color component, a texture component, a nutrient component, an aromatic component, a pH component, and/or a barrier component. Ingredient layer 106 can be formed from an ingredient solution that is applied to the kernels. The ingredient solution can include a combination of a film forming component and/or an ingredient component. The components can be mixed into a solution prior to application to the kernels.

The ingredient solution can be applied to the kernels having priming layer 104 during a mixing operation. In other aspects, ingredient solution can be applied via mixing, tumbling, spraying, panning, ladling, and/or immersion. The ingredient solution can be applied onto the kernels in an amount from about 0.1% to about 10% by weight of the uncoated kernels. The ingredient solution can be applied onto the kernels in an amount from about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0% to about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0% by weight of the uncoated kernels. In one aspect, the kernels can be mixed in the ingredient solution for about 1 to about 20 minutes depending on product and process variables. For example, the kernels can be mixed in the ingredient solution for about 1, 2, 3, 4, 5, 6, 7, 8, 9, 10, 11, 12, 13, 14, 15, 16, 17, 18, 19, 20 minutes to about 1, 2, 3, 4, 5, 6, 7, 8, 9, 10, 11, 12, 13, 14, 15, 16, 17, 18, 19, 20 minutes.

As indicated, the ingredient solution that forms ingredient layer 106 can include a combination of an ingredient and a carbohydrate polymeric film former. In one aspect, the carbohydrate polymeric film former can include cellulose material, hemi-cellulose material, gums, pectins, starches and/or starch derivatives. In one aspect, the film forming component can include gellan gum. For example, the gellan gum can include KELCOGEL® F Gellen Gum from CP KELCO Corporation. The gellan gum can be a fine mesh multifunctional gelling agent for use in foods. The gellan gum can have a particle size from about 150 μm to about 180 μm. A 1% concentration of the gellan gum in de-ionized water can have a pH from about 4.5 to about 6.5. In one aspect, the gum can be mixed with the sodium citrate in order to increase hydration of the gum.

Even though gellan gum is indicated above, a variety of food-grade gums can be used for the film forming component. For example, a few suitable materials can include bacterial polysaccharide gums such as xanthan gum, gum arabic, and cellulose gum or mixtures thereof. By "bacterial" in this context, it is meant that the gum comprises a product of a microorganism's operation on a fermentation medium. Food grade starches can also be suitable film forming components. Starches, in a pregelatinized or non-pregelatinized form, hydrate in water and have good film-forming properties. Examples of suitable starches can include instant starch, cooked starch, and maltodextrin.

The carbohydrate polymeric film former can be present in the ingredient solution from about 0.005% to about 2.000% by total weight of the ingredient solution. In one aspect, the carbohydrate polymeric film former is from about 0.065% to about 0.090% by total weight of the ingredient solution. The carbohydrate polymeric film former can be present in the ingredient solution from about 0.005%, 0.010%, 0.020%, 0.030%, 0.040%, 0.050%, 0.060%, 0.070%, 0.080%, 0.090%, 0.100%, 0.150%, 0.200%, 0.250%, 0.300%, 0.350%, 0.400%, 0.450%, 0.500%, 0.600%, 0.700%, 0.800%, 0.900%, 1.000%, 1.100%, 1.200%, 1.300%, 1.400%, 1.500%, 1.600%%, 1.700%, 1.800%, 1.900%, 2.000% to about 0.005%, 0.010%, 0.020%, 0.030%, 0.040%, 0.050%, 0.060%, 0.070%, 0.080%, 0.090%, 0.100%, 0.150%, 0.200%, 0.250%, 0.300%, 0.350%, 0.400%, 0.450%, 0.500%, 0.600%, 0.700%, 0.800%, 0.900%, 1.000%, 1.100%, 1.200%, 1.300%, 1.400%, 1.500%, 1.600%%, 1.700%, 1.800%, 1.900%, 2.000% by total weight of the ingredient solution As indicated, the ingredient solution that forms the ingredient layer also includes an ingredient component. The ingredient component can include a flavor component, a texture component, a nutrient component, a color component, an aromatic component, and mixtures thereof. As an example, the ingredient component can include a cheese flavor component to impart a cheese flavor impact when the popped kernel is consumed. As another example, the ingredient component can include a cheese flavor component and an orange color component to impart the combination of a cheese flavor impact and an orange color impact. As yet another example, the ingredient component can include the combination of a cheese flavor component, an orange color component, a calcium nutrient component, and a cheese aromatic component. As more fully set forth below, there is a myriad of combinations and subcombinations of ingredients.

By use of the term "flavor component", what is intended is a flavor additive or multiple flavor additives that modify the flavor of the ingredient component compared to if the flavorant was not present. That is, the flavor component adds an effective amount of flavor that is discernable to the consumer of the popped product. Examples of natural and artificial flavor components include, but are not limited to: butter, sugar or sweet (such as chocolate, chocolate mint, mint, chocolate banana, honey, vanilla, pineapple, coconut, and peppermint), cheese (such as cheddar cheese, mild cheddar, white cheddar, blue cheese, mozzarella, parmesan), pizza, salsa, barbeque, smoke, hickory, applewood or mesquite, dry roast, buffalo wing, fruit flavors (such as apple, cherry, berry, orange, banana, pineapple), vegetable flavors (such as tomato, onion, jalapeno, habaneros), pickle, spices (such as garlic, onion, chives, parsley, general herb, mustard, pepper, cinnamon), sour cream, sweet cream, honey mustard, hot mustard, and vinegar. Flavorants that provide sour flavors or spicy or hot flavors can also be used. A wide variety of other flavors or flavor enhancers can be used and would be included as a flavorant. For example, peanut flavors, yeast extracts, or similar materials are useable.

Any of these stated flavor components can be used as a solid material (such as a dry powder or a bead) and/or a liquid material (such as an oil or a solution). Some examples of solid or dry flavor components can incorporate the flavors in a protein shell, protecting sensitive components from loss or degradation during processing (such as heating) or interaction with other food ingredients (such as oil). Release of the full flavor profile can be delivered by the shearing action of chewing the final, popped popcorn product. Liquid flavorants can be supported on a powdered base such as maltodextrin or cornstarch in order to provide a dry flavorant. Conversely, dry flavorants can be dissolved or otherwise mixed with a liquid to provide liquid flavorants.

By use of the term "color component", what is intended is a color additive or multiple color additives that modify the natural color of the ingredient component compared to if the color component was not added. That is, the color component adds an effective amount of color that is discernable to the consumer of the popped product. For example, when a yellow hue is desired, a yellow dye can be added to the ingredient solution. Yet, various color agents can be included in the ingredient component for coloring the ingredient layer for a variety of purposes. For example, during St. Patrick's Day a green dye can be used. Also, the color component can accent a flavor component. For example, an ingredient layer having a Cajun flavor component can be accented with a red hued color component.

By use of the term "nutrient component", what is intended is a nutrient additive or multiple nutrient additives for facilitating a discernable or indiscernible health effect. Such nutrient components can include fatty acids such as omega-3 fatty acids, omega-6 fatty acids, saturated fatty acids and monounsaturated fatty acids. Other nutrient components can include amino acids such as Isoleucine, Leucine, Lysine, Methionine, Phenylalanine, Threonine, Tryptophan, Valine, Histidine, Tyrosine and Selenocysteine. Other amino acids can include Alanine, Arginine, Aspartate, Cysteine, Glutamate, Glutamine, Glycine, Proline, Serine, Asparagine, and Pyrrolysine. Other nutrient components can include vitamins such as retinol, choline, thiamin, riboflavin, vitamin G, niacin, vitamin P, vitamin PP, adenine, epileptic biotin, pantothenic acid, pyridoxine, pyridoxamine, or pyridoxal, biotin, vitamin H, folic acid, folate, vitamin M, cobalamin, ascorbic acid, ergocalciferol, cholecalciferol, tocopherol, and naphthoquinoids. Yet another "nutrient component" can include dietary minerals such as calcium, chloride, chromium, cobalt, copper, iodine, iron, magnesium, manganese, molybdenum, nickel, phosphorus, potassium, selenium sodium sulfur, and zinc.

By use of the term "aromatic component", what is intended is an aromatic additive or multiple aromatic additives that modify and/or enhance the natural aroma of the ingredient component compared to if the aromatic component was not added. That is, the aromatic component adds an effective amount of aroma that is discernable to the consumer of the popped product. An aromatic component can allow for a controlled release of a desired aroma from ingredient delivery system 100. In one aspect the aromatic component can be configured to compliment a flavor component and/or color component. In some aspects, the aromatic component is configured to not taste. The aromatic component may be released by multiple mechanisms, including time, heat, and/or physical manipulation, such as a popping action of the kernels. Some example aromatic components, which are not meant to be limiting, can include Aldehyde C-16, Aldehyde C-18, Aldehyde C-19, Aldehyde C-20, Aldehyde C-8, Aldehyde C-9, Aldron, Allyl Amyl Glycolate, Alpha Amyl Cinnamic, Aldehyde, Alpha Damascon, Alpha Ionone, Cumarin, Cyclogalbanate, Cyclosrose, Dep (Di Etyl Phthalate), DHM (Di, Hydro Mercenol), Di Hydro Iso Jasmone, DMHQ (Dimethyl Hydro Quinone), DMO (Di Methyl Octonol), Ethyl Maltol, Ethyl Vanilline, Eucalyptol, Neroline Bromalia, Nopyl Acetate, Orange Oil P.E.M.E., Para Cresyl Acetate, Para Cresyl Phenyl Acetate, Patcholi, Petit Grain, Phenyl Acetic Acid, and Phenyl Ethyl Alcohol.

The ingredient component can be present in the ingredient solution from about 10% to about 75% by total weight of the ingredient solution. For example, the ingredient component can be present in the ingredient solution from about 10%, 15%, 20%, 25%, 30%, 35%, 40%, 45%, 50%, 55%, 60%, 65%, 70%, 75%, to about 10%, 15%, 20%, 25%, 30%, 35%, 40%, 45%, 50%, 55%, 60%, 65%, 70%, 75% by total weight of the ingredient solution. The ingredient solution can include about 25% to about 90% water by weight of the ingredient solution. The ingredient solution can include about 25%, 30%, 35%, 40%, 45%, 50%, 55%, 60%, 65%, 70%, 75%, 80%, 85%, 90%, to about 25%, 30%, 35%, 40%, 45%, 50%, 55%, 60%, 65%, 70%, 75%, 80%, 85%, 90% water by weight of the ingredient solution.

The ingredient solution can have a density of about 1.018 g/cm$^3$. In other aspects, the ingredient solution can have a density from about 0.900 g/cm$^3$ to about 1.100 g/cm$^3$. The density of the ingredient solution can be from about 0.900 g/cm$^3$, 0.910 g/cm$^3$, 0.920 g/cm$^3$, 0.930 g/cm$^3$, 0.940 g/cm$^3$, 0.950 g/cm$^3$, 0.960 g/cm$^3$, 0.970 g/cm$^3$, 0.980 g/cm$^3$, 0.990 g/cm$^3$, 1.000 g/cm$^3$, 1.010 g/cm$^3$, 1.020 g/cm$^3$, 1.030 g/cm$^3$, 1.040 g/cm$^3$, 1.050 g/cm$^3$, 1.060 g/cm$^3$, 1.070 g/cm$^3$, 1.080 g/cm$^3$, 1.090 g/cm$^3$, 1.100 g/cm$^3$ to about 0.900 g/cm$^3$, 0.910 g/cm$^3$, 0.920 g/cm$^3$, 0.930 g/cm$^3$, 0.940 g/cm$^3$, 0.950 g/cm$^3$, 0.960 g/cm$^3$, 0.970 g/cm$^3$, 0.980 g/cm$^3$, 0.990 g/cm$^3$, 1.000 g/cm$^3$, 1.010 g/cm$^3$, 1.020 g/cm$^3$, 1.030 g/cm$^3$, 1.040 g/cm$^3$, 1.050 g/cm$^3$, 1.060 g/cm$^3$, 1.070 g/cm$^3$, 1.080 g/cm$^3$, 1.090 g/cm$^3$, 1.100 g/cm$^3$.

The ingredient solution can have a viscosity of about 350 cP at 68° F. In other aspects, the ingredient solution can have a viscosity from about 300 cP at 68° F. to about 400 cP at 68° F. At 68° F., the ingredient solution can have a viscosity from about 300 cP, 305 cP, 310 cP, 315 cP, 320 cP, 325 cP, 330 cP, 335 cP, 340 cP, 345 cP, 350 cP, 355 cP, 360 cP, 365 cP, 370 cP, 375 cP, 380 cP, 385 cP, 390 cP, 395 cP, 400 cP to about 300 cP, 305 cP, 310 cP, 315 cP, 320 cP, 325 cP, 330 cP, 335 cP, 340 cP, 345 cP, 350 cP, 355 cP, 360 cP, 365 cP, 370 cP, 375 cP, 380 cP, 385 cP, 390 cP, 395 cP, 400 cP.

After application of the ingredient solution and the setting of the ingredient solution on the kernel, ingredient layer 106 can have a thickness from about 25 nm to about 50 μm. The thickness can be from about 25 μm, 30 μm, 35 μm, 40 μm, 45 μm, 50 μm to about 25 μm, 30 μm, 35 μm, 40 μm, 45 μm, 50 μm.

3. Sealant Layer

Sealant layer 108 facilitates a protective barrier to ingredient layer 106. Furthermore, sealant layer 108 provides a generally smooth outer surface which facilitates manufacturing transport processes without substantial flaking of ingredient delivery system 100. Sealant layer 108 can be formed from a sealant solution that is applied to the kernels. The sealing solution can be applied via tumbling, mixing, spraying, panning, ladling, and/or immersion. The sealant solution can be applied onto the kernels in an amount from about 0.1% to about 10% by weight of the uncoated kernels. The sealant solution can be applied onto the kernels in an amount from about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0% to about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0% by weight of the uncoated kernels. In one aspect, the kernels can be mixed in the sealant solution for about 1 to about 20 minutes depending on product and process variables. For example, the kernels can be mixed in the sealant solution for about 1, 2, 3, 4, 5, 6, 7, 8, 9, 10, 11, 12, 13, 14, 15, 16, 17, 18, 19, 20 minutes to about 1, 2, 3, 4, 5, 6, 7, 8, 9, 10, 11, 12, 13, 14, 15, 16, 17, 18, 19, 20 minutes.

The sealant solution that forms sealant layer 108 can include one or more carbohydrate polymeric film formers. For example, the carbohydrate polymeric film formers can include a cellulose component, a hemi-cellulose component, gums, pectins, starches and/or starch derivatives. In one aspect, the carbohydrate polymeric film former is a cellulose and starch blend. Example cellulose material can include hydroxypropylmethylcelluose. Example hydroxypropylmethylcelluose can include METHOCEL E5 Premium LV Hydroxypropyl Methylcellulose manufactured by The DOW Chemical Company of Midland, Mich. In another aspect, the hydroxypropylmethylcelluose includes METHOCEL E15 Premium LV Hydroxypropyl Methylcellulose manufactured by The DOW Chemical Company of Midland, Mich.

Even though ingredient components were indicated above in association with ingredient layer 106, one or more ingredient components can also be associated with sealant layer 108. In other aspects, an ingredient component can be associated with sealant layer 108 in lieu of being associated with ingredient layer 106. For example, an aromatic component can be associated with sealant layer 108 to maximize the potential for a perceivable smell effect.

The cellulose material can be from about 1% to about 25% by weight of the sealant solution. In other aspects, the cellulose material can be from about 8% to about 12% by weight of the sealant solution. The cellulose material can be from about 1%, 2%, 3%, 4%, 5%, 6%, 7%, 8%, 9%, 10% 11%, 12%, 13%, 14%, 15%, 16%, 17%, 18%, 19%, 20%, 21%, 22%, 23%, 24%, 25% to about 1%, 2%, 3%, 4%, 5%, 6%, 7%, 8%, 9%, 10% 11%, 12%, 13%, 14%, 15%, 16%, 17%, 18%, 19%, 20%, 21%, 22%, 23%, 24%, 25% by weight of the priming solution. The sealant solution can include from about 75% to about 99% by weight of water. In other aspects, the sealant solution includes about 88% to about 92% by weight of water. The sealant solution can include about 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% to about 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% by weight water.

The sealant solution can have a density of about 1.024 g/cm$^3$. In other aspects, the sealant solution can have a density from about 0.900 g/cm$^3$ to about 1.100 g/cm$^3$. The density of the sealant solution can be from about 0.900 g/cm$^3$, 0.910 g/cm$^3$, 0.920 g/cm$^3$, 0.930 g/cm$^3$, 0.940 g/cm$^3$, 0.950 g/cm$^3$, 0.960 g/cm$^3$, 0.970 g/cm$^3$, 0.980 g/cm$^3$, 0.990 g/cm$^3$, 1.000 g/cm$^3$, 1.010 g/cm$^3$, 1.020 g/cm$^3$, 1.030 g/cm$^3$, 1.040 g/cm$^3$, 1.050 g/cm$^3$, 1.060 g/cm$^3$, 1.070 g/cm$^3$, 1.080 g/cm$^3$, 1.090 g/cm$^3$, 1.100 g/cm$^3$ to about 0.900 g/cm$^3$, 0.910 g/cm$^3$, 0.920 g/cm$^3$, 0.930 g/cm$^3$, 0.940 g/cm$^3$, 0.950 g/cm$^3$, 0.960 g/cm$^3$, 0.970 g/cm$^3$, 0.980 g/cm$^3$, 0.990 g/cm$^3$, 1.000 g/cm$^3$, 1.010 g/cm$^3$, 1.020 g/cm$^3$, 1.030 g/cm$^3$, 1.040 g/cm$^3$, 1.050 g/cm$^3$, 1.060 g/cm$^3$, 1.070 g/cm$^3$, 1.080 g/cm$^3$, 1.090 g/cm$^3$, 1.100 g/cm$^3$.

The sealant solution can have a viscosity of about 200 cP at 68° F. In other aspects, the sealant solution can have a viscosity from about 180 cP at 68° F. to about 220 cP at 68° F. At 68° F., the sealant solution can have a viscosity from about 180 cP, 182 cP, 184 cP, 186 cP, 188 cP, 190 cP, 192 cP, 194 cP, 196 cP, 198 cP, 200 cP, 202 cP, 204 cP, 206 cP, 208 cP, 210 cP, 212 cP, 214 cP, 216 cP, 218 cP, 220 cP to about 180 cP, 182 cP, 184 cP, 186 cP, 188 cP, 190 cP, 192 cP, 194 cP, 196 cP, 198 cP, 200 cP, 202 cP, 204 cP, 206 cP, 208 cP, 210 cP, 212 cP, 214 cP, 216 cP, 218 cP, 220 cP.

The sealant solution can have a pH of about 7.0. In other aspects, the sealant solution can have a pH from about 6.5 to about 7.5. The pH can be from about 6.5, 6.6, 6.7, 6.8, 6.9, 7.0, 7.1, 7.2, 7.3, 7.4, 7.5 to about 6.5, 6.6, 6.7, 6.8, 6.9, 7.0, 7.1, 7.2, 7.3, 7.4, 7.5.

After application of the sealant solution and the setting of the sealant solution on the kernel, sealant layer 108 can have a thickness from about 10 μm to about 15 μm. The thickness can be about 10 μm, 11 μm, 12 μm, 13 μm, 14 μm, 15 μm to about 10 μm, 11 μm, 12 μm, 13 μm, 14 μm, 15 μm.

Kernels having ingredient delivery system 100 can make up at least a portion of a kernel charge. For example, a kernel charge can include a portion of kernels having ingredient delivery system 100 along with a portion of native kernels. In other aspects, kernels having ingredient delivery system 100 can make up all of the kernels of the charge. The kernel charge can include multiple ingredient combinations within the charge. For example, a portion of the kernels within the charge can have an ingredient delivery system with an ingredient layer having a first flavor component. A second portion of the kernels within the charge can have an ingredient delivery system with an ingredient layer having a second flavor component. As such, flavor combinations can be generated between various kernels within the charge. As another example, a first portion of the kernels within the charge can have an ingredient deliver system with an ingredient layer having a nutrient. A second portion of the kernels within the charge can have an ingredient delivery system with an ingredient layer having a first flavor component. As such, the charge as a whole can provide both a flavor and a nutrient. Given the disclosure herein, a myriad of ingredient combinations exist for the ingredient component as indicated above; yet, a myriad of ingredient combinations also exist by different combinations of ingredient delivery systems within the charge as a whole.

B. SLURRY

Ingredient delivery system 100 can be included in combination with a slurry. For example, kernels having ingredient delivery system 100 can be included with a slurry in a microwave popcorn package. In other aspects, kernels having ingredient deliver system 100 can be apart from a slurry and packaged in bulk form for popping with an oil and/or air popper.

As indicated, the popcorn composition can include a slurry to facilitate the popping of the kernels in a package. The slurry can include an oil/fat and optionally an ingredient. The ingredients can include any of the ingredients discussed above and are incorporated herein by reference. The ingredient can be a same ingredient as the ingredient of the ingredient delivery system 100. The ingredient can also include other ingredients different than the ingredient of the ingredient delivery system 100. In such a situation, ingredient profiles can be obtained. The slurry could be either a liquid or solid prior to the popping process. In some situations, the slurry is a liquid during the popping process.

If present, the amount of slurry, in relation to the entire unpopped popcorn composition, can be less than about 50% by weight of the entire unpopped popcorn composition. In other aspects, the slurry can be less than about 40% by weight of the entire unpopped popcorn composition. If present, the amount of slurry can be at least 1% by weight of the entire unpopped popcorn composition.

If a slurry is present, an ingredient can be mixed within and throughout the slurry. The amount of ingredient within the slurry can be at least about 0.5% by weight of the slurry and can be less than about 60% by weight of the slurry. In many aspects, levels of ingredient in the slurry are at least 1% by weight and no more than about 15% by weight.

An example slurry can include an oil/fat component, sometimes referred to as an oil component or as a fat component. The oil/fat component can be entirely oil, can be entirely fat, or a combination of the two. Generally, an "oil" component is liquid at room temperature and a "fat" component is solid at room temperature. Many forms of oil/fat component are substantially solid at room temperature and readily melt during the microwave popcorn popping process. Among other things, a function of the oil/fat component is to rapidly melt during the microwave popcorn process to provide an even distribution of heat, and to distribute (e.g., splash) flavorant over the flakes.

The oil/fat component can include an oil or oil/fat having a melting point below 120° F. (49° C.). In other aspects, the melting point can be below 115° F. (46° C.). For example, the oil component can be formulated with an oil having a melting point of about 111° F. (44° C.) or less. Oil components can have a melting point within the range of 95° to 111° F. (35° C. to 44° C.). Of course, the composition could be formulated with oil components that have a higher melting point, for example, on the order of 115° F. to 120° F. (46° C. to 49° C.).

Liquid oils for use in the oil/fat component can include partially hydrogenated vegetable oils. Further, suitable oils include sunflower oil, safflower oil, rapeseed oil, cottonseed oil, maize oil or corn oil, linseed oil, groundnut oil, and soybean oil. Other suitable oils include nut oils (such as almond, Brazil nut, cashew, coconut, hazelnut, pecan, peanut, and walnut), olive oil, palm oil, sesame oil, and flaxseed oil. In one aspect, the oil comprises at least 50% partially hydrogenated soybean oil having a melting point of 100° to 111° F. (37° to 44° C.). In another aspect, at least 90% of the oil in the oil component is partially hydrogenated. In still other aspects, at least 99% of the oil in the oil component is partially hydrogenated soybean oil having a melting point within the range of 100° to 111° F. (37° to 44° C.).

The amount of oil in the oil/fat component can be at least 70%, and in some situations, at least 75%. In some aspects, the level of oil in the oil/fat component can be about 80% to 95%. One level of oil/fat component, in respect to the popcorn composition, can be at least 25% and no greater than about 50%. In one aspect, the level is about 25-35%. Popcorn compositions having these levels of oil/fat component are referred to as "traditional" popcorn compositions, based on "traditional" levels of oil/fat. Another level of oil/fat component, in respect to the popcorn composition, can be no greater than about 20%. In one aspect, the level is about 10-13%. Popcorn compositions having these levels of oil/fat component are referred to as "low fat" or "light fat" popcorn compositions, based on "low" or "light" levels of oil/fat. Yet another level of oil/fat component, in respect to the popcorn composition, can be no greater than about 8%. In one aspect, the level can be about 1.5-4%. Popcorn compositions having these levels of oil/fat component are referred to as "ultra low fat" popcorn compositions, based on "ultra low" levels of oil/fat.

Typical levels of slurry, if present, with respect to the unpopped popcorn kernels, can be less than about 80%. In other aspects, less than about 60%. One level of slurry, with respect to the unpopped popcorn kernels, is about 40-50%. Some popcorn compositions, such as the "low fat" or "light fat" products, can have an amount of slurry greater than about 1% and less than about 20%. Levels of slurry can be about 7-14%, and about 1.5-4% of the total popcorn composition.

C. POPCORN PACKAGING

Kernels having ingredient delivery system 100 can be included in a package. As indicated above, the packaged can include a slurry. In other aspects, the package can be devoid of a slurry. The package can include a shipping package such as a bulk or consumer bag, jar, box or other container. The package can also include a microwave popcorn package. A variety of types of microwave popcorn packages have been developed. Both flexible bag arrangements and tub arrangements can be utilized herein, as well as other arrangements. With respect to FIGS. 4-9, a flexible bag arrangement is shown.

Flexible and expandable microwave popcorn arrangements utilizing bags generally involve a collapsed paper or treated paper package having a microwave interactive sheet receptor, or susceptor, operably positioned therein. A microwaveable popcorn composition can be positioned in covering relation or in thermoconductive relation to the microwave interactive construction. For many microwave popcorn bag arrangements, the package can be folded into a tri-fold configuration during storage and prior to use. The tri-fold package may be positioned in a moisture barrier storage over-wrap for enhancing the shelf life of the contents.

Figure 4:
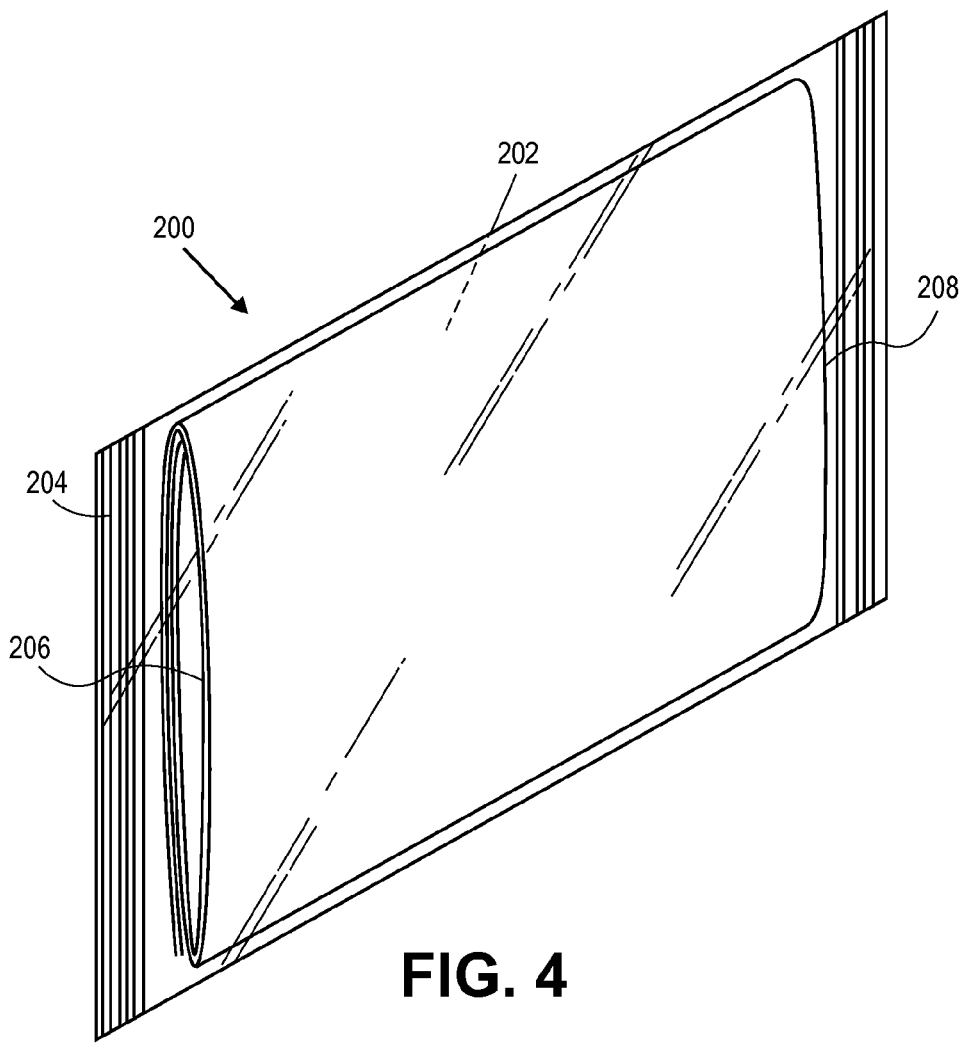
FIG. 4 is a view of a popcorn package in an overwrap.
Figure 5:
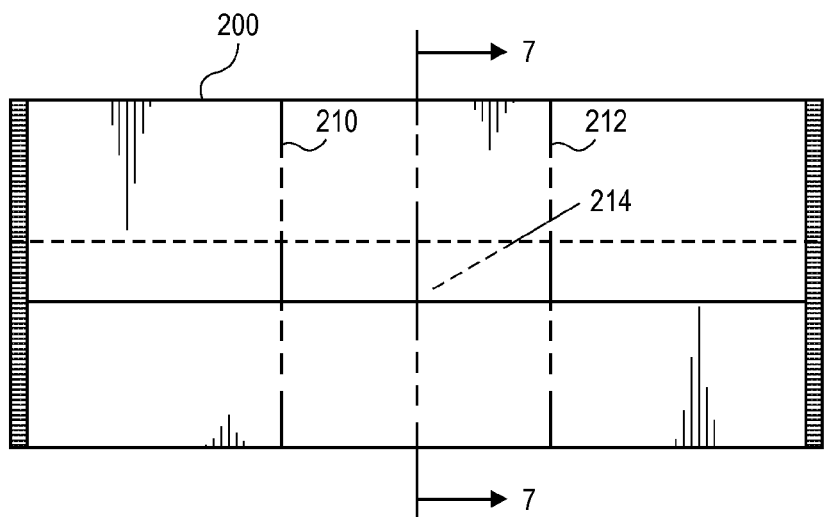
FIG. 5 is a top plan view of a popcorn package.
Figure 6:
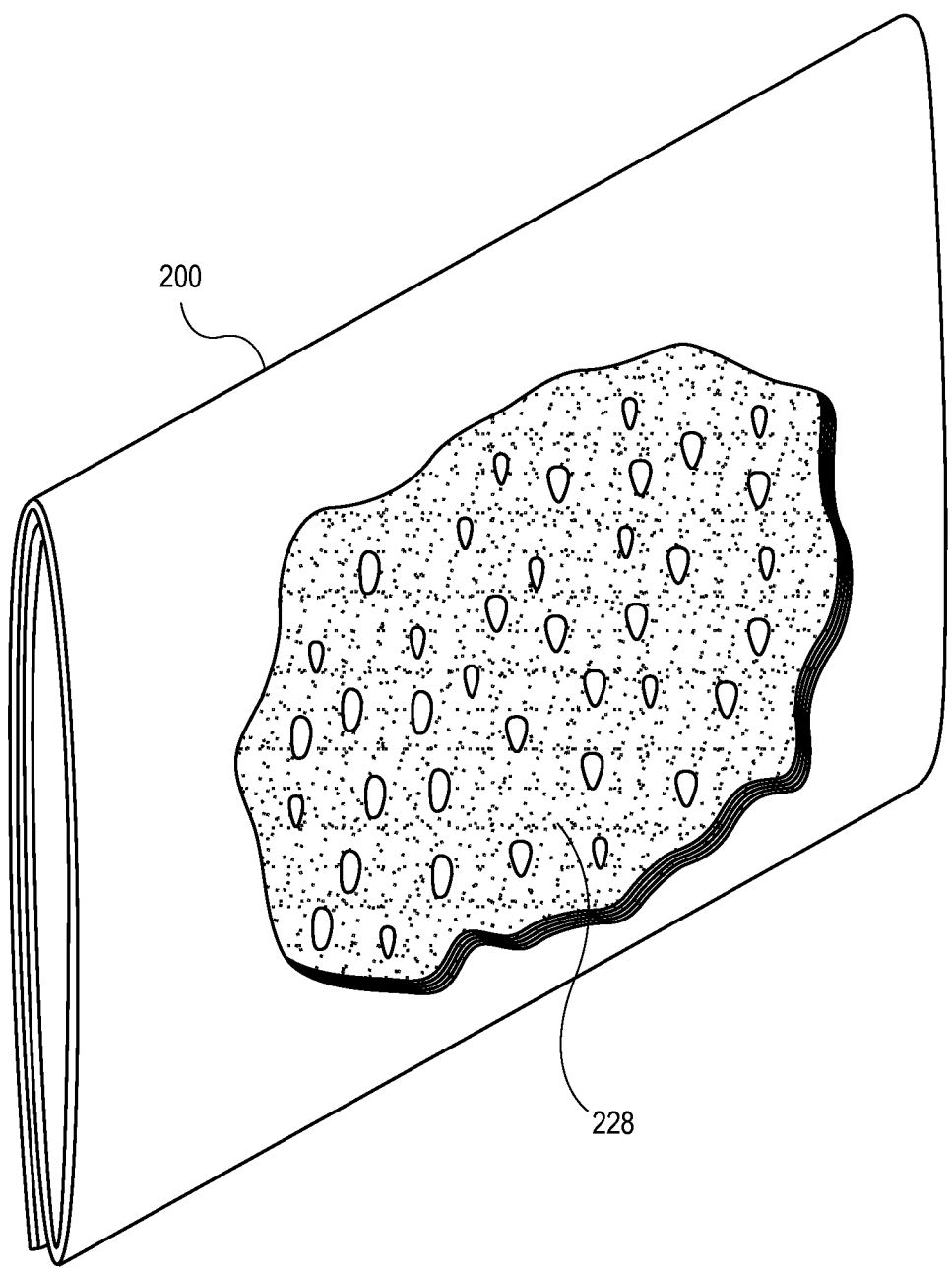
FIG. 6 is a perspective view of a popcorn package.

Reference numeral 200, FIGS. 4 and 5, depicts an example flexible microwaveable popcorn package. In FIG. 4, popcorn package 200 is depicted in a tri-fold configuration 202 for storage. In FIG. 4, the tri-fold configuration 202 can be sealed within a storage over-wrap 204. A usable storage over-wrap 204 can comprise 90-140 gauge, biaxially oriented polypropylene material, although other materials can be used. The over-wrap can be discarded when the popcorn package is removed for use.

Still referring to FIG. 4, the microwave popcorn package 200 has two opposite sides 206, 208. Each opposite side 206, 208 comprises two side gusset outside edges, along which creases are located. As indicated, the microwaveable popcorn package 200 is shown as a tri-fold arrangement. It will be apparent, however, that techniques according to the present disclosure can be utilized in other package arrangements.

In FIG. 5, a top plan view of microwaveable popcorn package 200 is schematically shown in an unfolded orientation, similar to positioning in a microwave oven for a step of popping an internally received popcorn charge, but before expansion. In FIG. 5, lines 210 and 212 indicate fold lines which can define central region 214 in the microwaveable popcorn package 200. Lines 210 and 212 indicate folds to form the tri-fold shown in FIG. 4. In central region 214, an unpopped popcorn charge can be positioned in an orientation against, and when oriented according to FIG. 5, above a portion of the microwaveable popcorn package 200 in which a microwave interactive construction, or susceptor can be positioned. Herein, in this context, the term "microwave interactive" can refer to a material which absorbs energy and becomes hot upon exposure to microwave energy in a microwave oven.

During a popping operation, moisture inside the popcorn kernels absorbs microwave energy generating sufficient steam and heat for kernel popping and expansion of microwaveable popcorn package 200. In addition, microwave interactive material absorbs microwave energy and dissipates heat to the popcorn charge. The microwave interactive material can internally occupy at least central region 214 for greater thermoconductive contact with at least a portion of that region. Most of the microwave interactive material (by area or weight) can be positioned in thermoconductive contact with a region of the bag interior in which the microwave interactive material will be covered by the popping charge when the microwaveable popcorn package 200 is positioned in the microwave oven for use. This can lead to efficient utilization of the microwave interactive material and efficient heat transfer or heat retention in connection with a popcorn popping process.

Figure 7:
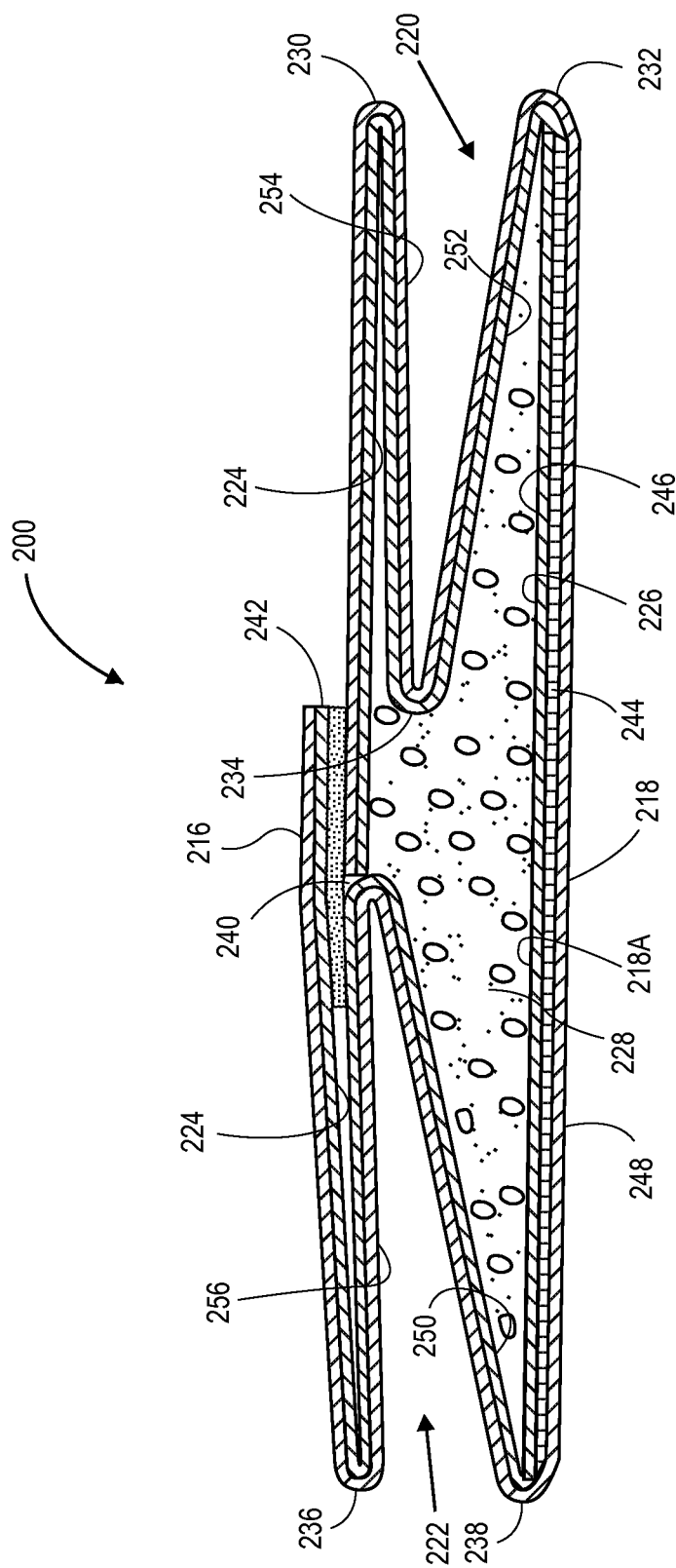
FIG. 7 is a cross sectional view, through lines 7-7 of a popcorn package.

Attention is now directed to FIG. 7, a cross-sectional view taken generally along line 7-7, FIG. 5. From a review of FIG. 7 it will be understood the popcorn package generally comprises the construction defining first and second opposite face panels 216, 218, joined by first and second opposite, inwardly directed, side gussets 220, 222. Inwardly directed refers to gussets 220, 222 in the cross-section of FIG. 7, pointing or extending toward each other.

Gussets 220, 222 generally separate microwaveable popcorn package 200 into first and second expandable tubes 224 and 226. The popcorn charge 228 can be substantially positioned and retained within one of the tubes. The other tube, prior to popping, can be generally collapsed. Tube 224 can be seal closed by temporary heat seals prior to the popping operation. The popcorn charge 228, inside of the microwaveable popcorn package 200, can include unpopped popcorn kernels and a popping slurry.

Still referring to FIG. 7, the side gusset 220 generally comprises outwardly directed edge creases or folds 230 and 232, fold 232 being adjacent to face panel 218 and fold 230 being adjacent to face panel 216, and inwardly directed, central fold 234. Similarly, gusset 222 comprises outwardly directed edge creases or folds 236 and 238, and inwardly directed, central fold 240, fold 238 being adjacent to face panel 218 and fold 236 being adjacent to face panel 216. Microwaveable popcorn package 200, for the arrangement shown in FIG. 5, can be folded from a two-ply sheet of material, and panel 216 includes central longitudinal seam 242. Example flexible microwave popcorn bags can be found in U.S. Pat. Nos. 5,044,777; 5,195,829; and 5,650,084, all incorporated herein by reference. Further packaging arrangements are described in PCT WO 2006/004906, published Jan. 12, 2006, and in PCT WO 2005/080225, published Sep. 1, 2005, both incorporated herein by reference. Further microwave popcorn packages are disclosed in U.S. Publication No. 2008/0166457 published Jul. 8, 2008; U.S. Publication No. 2010/0068353 published Mar. 18, 2010; U.S. patent application Ser. No. 12/880,938 filed Sep. 13, 2010; U.S. patent application Ser. No. 12/993,123 filed Nov. 23, 2010; and PCT 2008/50391 filed Jan. 7, 2008. All of the aforementioned applications are incorporated herein by reference.

Underneath popcorn charge 228, microwaveable popcorn package 200 can include microwave interactive construction or susceptor 244. The susceptor 244 can comprise a metallized polyester film. In certain arrangements, such as the one shown in FIG. 7, susceptor 244 can be positioned between layers of ply 246, 248 from which the microwaveable popcorn package 200 is folded. Even with the susceptor 244 positioned between flexible sheets 246, 248, microwaveable popcorn package 200 is referenced as two-ply. In the arrangement shown in FIG. 7, the susceptor 244 occupies a portion of the area between the plies 246, 248. The plies 246, 248 comprise a paper material, sometimes treated. Descriptions of example materials are provided in PCT WO 2005/080225, published Sep. 1, 2005, incorporated herein by reference.

Still referring to FIG. 7, surface 218A defines an unpopped popcorn charge retention surface. This is because the unpopped popcorn charge 228 can be generally positioned in contact with surface 218A, on surface 218A, where the microwaveable popcorn package 200 is positioned in a microwave oven for popping. Referring to FIG. 7, the gusset 222 includes a panel section 250 adjacent to, and integral with, face panel 218, and gusset 220 includes a panel section 252 adjacent to, and integral with, face panel 218.

Figure 8:
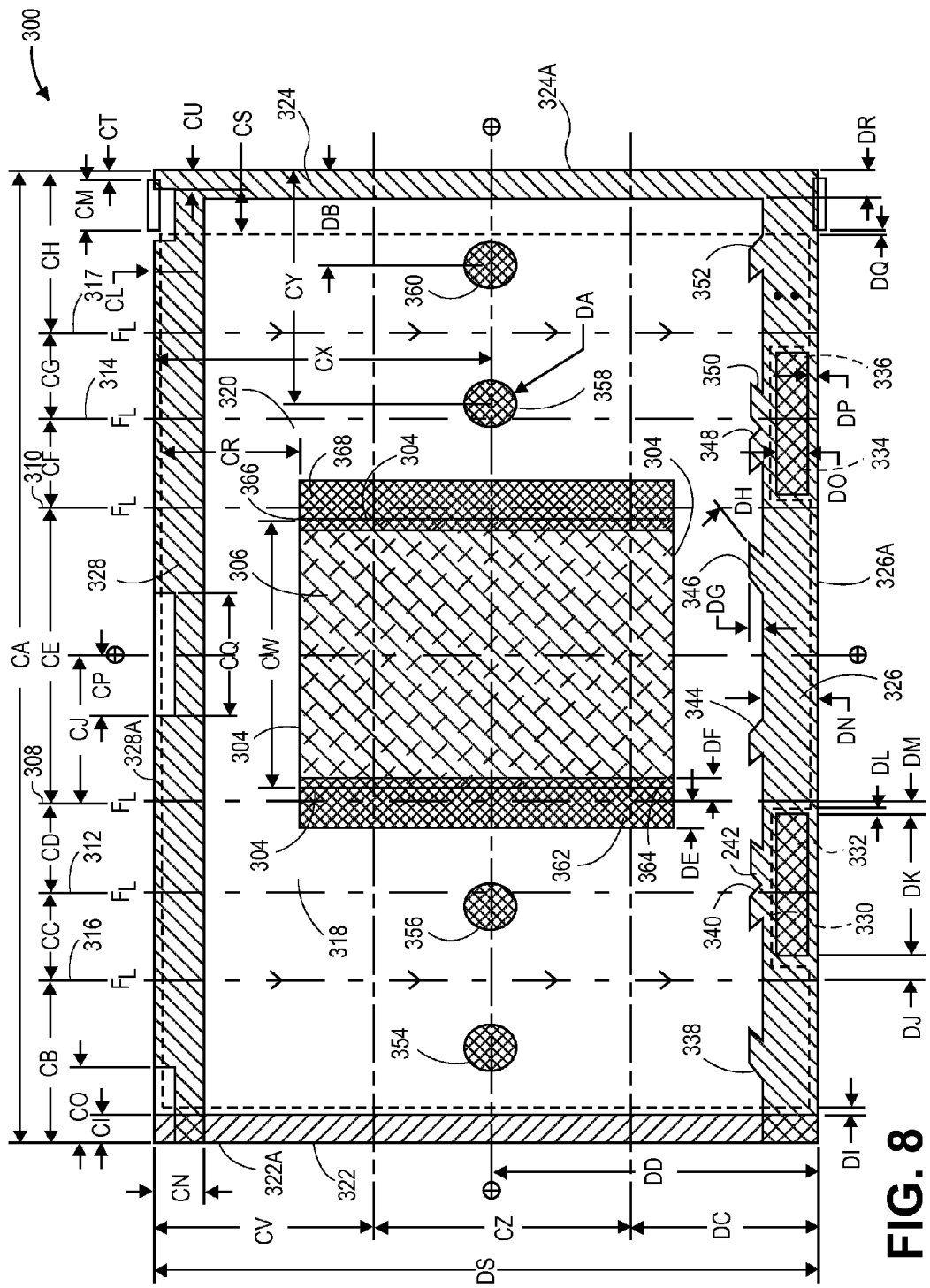
FIG. 8 is a schematic plan view of a packaging blank for forming a popcorn package.

Attention is now directed to FIG. 8. FIG. 8 is a top plan view of a bag blank, panel or sheet 300 from which an arrangement according to FIGS. 4, 5, and 7 can be folded. Usable features for the blank 300, including example features illustrated in FIG. 8, are generally disclosed and described in PCT Applications WO 2005/080225 and WO 2006/004906, each of which is incorporated herein by reference. As is discussed in those references, a variety of sealing arrangements can be used to provide for desirable features in the microwaveable popcorn package 200. The sealant fields indicated in FIG. 8 are meant to provide an example of a usable arrangement, with many alternatives being possible.

The view shown in FIG. 8 is what is sometimes referred to as the "back side" of sheet 300, i.e., the side 302 of sheet 300 that forms an interior surface of the microwaveable popcorn package 200, FIG. 4. The side opposite the side view in FIG. 4 is sometimes referred to as the "front side," and can form an exterior surface of microwaveable popcorn package 200. Additionally, the mirror image arrangement is possible.

Still referring to FIG. 8, line segment 304 defines a region 306 within which, for some aspects, at least a portion of the microwave interactive material, such as a microwave interactive material in construction 244, FIG. 7, can be associated. The microwave interactive construction can be positioned on an interior, an exterior, or between plies 246, 248. For some embodiments microwave interactive construction 244 is positioned between plies 246, 284 of blank 300. Between plies 246, 248 a variety of adhesive patterns may be utilized. Examples are described in PCT WO 2005/080225, incorporated herein by reference.

Still referring to FIG. 8, line 308 generally indicates where fold 232, FIG. 7, can be formed and line 310 generally indicates where fold 238, FIG. 7, can be formed. Folds or creases 232, 238 are generally outwardly directed folds or creases in opposite side gussets 220, 222 adjacent to face 218. Line 312 corresponds to fold 240 and line 316 corresponds to fold 236. Region 318, between fold lines 308 and 310, generally defines gusset panel section 250 and region 320, between fold lines 310 and 314, would generally define gusset panel section 252.

In general, the microwaveable popcorn package 200 is eventually formed by folding the microwaveable popcorn package 200 such that it folds along appropriately spaced regions perpendicular to lines 308, 310, 312, 314, 316, 317. It will be understood that the latter folding may generally be after the bag construction has been otherwise assembled.

Sealant field 322, along edge 322A, is used to engage field 324 along edge 324A during folding, (typically with applied heat and pressure). During folding, various portions of field 326 along edge 326A may line up with each other to form various portions of an end seal (typically with application of heat and pressure), and various portions of field 328, along edge 328A, may align with one another to form an end seal (typically with application of heat and pressure). In general, field 328 may form a top edge of the completed bag, through which popped popcorn can be removed after popping. Sealant fields 330 and 332, on the opposite side of panel 300, may align with one another when folding around fold line 312 is conducted, and heat and pressure are applied, to help secure panel 300. Similarly, sealant fields 334 and 336, on the underside of panel 300, align with one another when the panel is folded around fold line 314.

Attention is now directed toward sealant fields 338, 340, 342, 344, 346, 348, 350 and 352. Analogous fields may be found in PCT WO 2005/1080225 and 2006/004906, both incorporated herein by reference. During folding, portions of fields 338-352 align with one another to retain selected portions of the panel adhered to one another, typically after application of pressure and heat, to provide for expansion. In particular, field 338 engages field 340; field 342 engages field 344; field 348 engages field 346; and field 352 engages field 350 during folding and after application of pressure and heat. Engagement of fields 342, 344, 346 and 348 tend to retain selected portions of panels 252 and 250 against panel 218. Sealant field 338 folded against field 340, and field 352 folded against field 350, help retain panels 254 and 256 sealed against panel 216 in the collapsed microwaveable popcorn package 200. This helps to assure that the popcorn charge 228 is retained where desired in the arrangement. Advantages from this are described in part in U.S. Pat. No. 5,195,829 and in PCT WO 2005/080225 and 2006/004906, all incorporated herein by reference.

Attention is now directed to sealant fields 354, 356, 358 and 360. These sealant fields can be used to ensure that panels 254 and 256 are sealed against panel 216 so that the popcorn charge 228 is substantially retained in tube 226 and does not expand or spread substantially into tube 224 until desired during heating. In particular, fields 354 and 356 are oriented to engage one another when the arrangement is folded about fold line 316 with the application of heat and pressure. Fields 358 and 360 are oriented to engage one another, when the arrangement is folded about fold line 317 with application of heat and pressure.

In general, sealing results from application of heat and pressure, after folding, to the region where the seal is located. It is noted that for the various seals discussed, a sealant is positioned on both adjoining paper surfaces. However, in the event a sealant is only positioned on one side, and the two sides are folded together to follow application of appropriate heat and pressure, a seal may be formed. It is noted that the sealant fields discussed are configured to form seals with application of heat and pressure. Alternate types of seals, for example, cold seals, may be implemented in arrangements according to the present disclosure.

In the remaining discussion, options are provided for preferred management and control of wicking and flow characteristics of the oil/fat(s) (i.e., the slurry) in the popcorn charge during storage, handling and use. It is noted that the seals and fields can be used in one of many ways. Sealant fields can be used to form an insulating seal, to manage the location of oil/fat(s) by insulating it from portions of the package. Also, an application of the seal to a paper surface changes the surface tension properties of a surface, thus its interaction with the oil/fat(s) material. In general, the properties of the seal are used to operate for some containment of the oil/fat(s) material into untreatable locations. Thus, sealant fields can be applied to the paper at preferred locations where it is desirable to inhibit flow of the oil/fat(s) material as it liquefies. Both of these properties may be used. Examples of the techniques described are provided in PCT WO 2005/080225, published Sep. 1, 2005, incorporated herein by reference.

For the example shown in FIG. 8, fields 362, 364 are oriented to engage one another, with application of heat and pressure, during folding about fold line 308. Fields 366, 368 are oriented to engage one another, with application of heat and pressure, during folding about fold line 310. The seals resulting from fields 362, 364, 366 and 368, can protect against flow of oil/fat into the popcorn charge position in region 306 in the closed, folded popcorn package, from flowing to the gusset folds. This can help inhibit leakage during storage and use, since damage at microwaveable popcorn package 200, allowing for leakage, typically occurs where creasing takes place.

The particular package blank 300 depicted in FIG. 8, is configured for manufacture of a full size or regular size popcorn bag. The dimensions indicated by the letters in FIG. 8 can be as follows: CA=19.1250 inches; CB=3.1875 inches; CC=1.7188 inches; CD=1.7188 inches; CE=5.8750 inches; CF=1.7188 inches; CG=1.7188 inches; CH=3.1875 inches; CI=0.5 inches; CJ=2.9375 inches; CK=0.25 inches; CL=0.2 inches; CM=1.1562 inches; CN=0.8579 inches; CO=1.4375 inches; CP=1.1875 inches; CQ=2.375 inches; CR=2.5625 inches; CS=0.9375 inches; CT=0.1875 inches; CU=0.5 inches; CV=4.0 inches; CX=5.8750 inches; CY=4.5313 15 inches; CZ=4.0 inches; DA=0.75 inch diameter; DB=1.8438 inches; DC=3.6250 inches; DD=5.8125 inches; DE=0.5 inches; DF=0.5 inches; DG=0.25 inches; DH=0.370 inches; DI=0.125 inches; DJ=0.25 inches; DK=2.9375 inches; DL=0.125 inches; DM=0.25 inches; DN=1 inch; DO=0.625 inches; DP=0.2188 inches; DQ=0.0625 inches; DR=0.625 inches; and DS=11.625 inches. Other dimensions may be taken from scale.

Again, a variety of package arrangements may be utilized. An example depicted in FIG. 8 for a package blank being an example. Some usable alternatives are described in PCT WO 2005/080225, incorporated herein by reference. Still others may be used with applications and the techniques described herein without departing from the scope and spirit of the invention.

Figure 9:
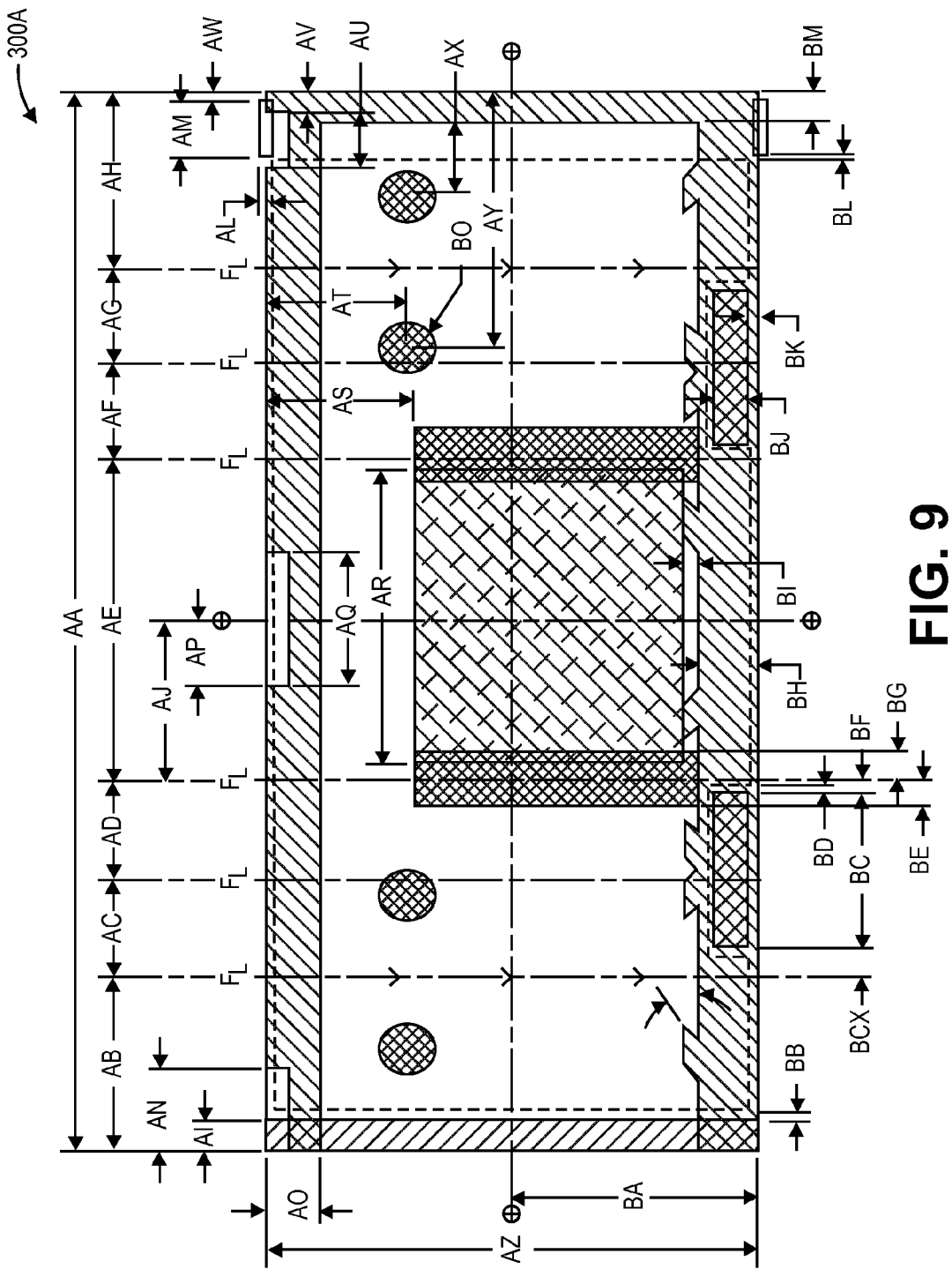
FIG. 9 is a schematic plan view of a packaging blank for forming a popcorn package.

In FIG. 9, package blank 300A can be configured into a mini bag in accordance with the general descriptions above. The various sealant fields indicated have analogous purposes to those described above for package blank 300. In FIG. 9, the various dimensions indicated can be as follows: AA=19.125 inches; AB=3.1875 inches; AC=1.7188 inches; AD=1.7188 inches; AE=5.875 inches; AF=1.7188 inches; AG=1.7188 inches; AH=3.1875 inches; AI=0.5 inches; AJ=2.9375 inches; AK=0.25 inches; AL=0.2 inches; AM=1.1562 inches; AN=1.4375 inches; AO=0.8579 inches; AP=1.1875 inches; AQ=2.375 inches; AR=5.375 inches; AS=2.375 inches; AT=2.25 inches; AU=0.9375 inches; AQ=1.875 inches; AV=0.5 inches; AX=1.8438 inches; AY=4.5313 AZ=8 inches; BA=4 inches; BB=0.125 inches; BC=2.9375 inches; BCX=0.25 inch; BD=0.125 inches; BE=0.5 inches; BF=0.25 inches; BG=0.5 inches; BH=1 inch; BI=0.25 inches; BJ=0.625 inches; BK=0.2188 inches; BL=0.0625 inches; BM=0.625 inches; and BO=0.75 inch diameter. Other dimensions may be taken from scale.

D. EXAMPLES

1. Blow-Off

In order to determine the affect of the layers with regard to blow-off during popping, various combinations of layers were tested. Seventeen samples were prepared for the combinations of: 1) the priming layer and the ingredient layer, 2) the ingredient layer and the sealant layer, and 3) the priming layer and the sealant layer. The samples were prepared by weighing 76.2 g of popcorn having the layer combinations. No slurry was added to these samples. This was done for each test variable and then all bags were heat sealed at 300° F. and 80 psi for 2.2 seconds. The layers were formed applying water based solutions to the kernels. The water based solutions were formed according to the dry weight ingredients indicated as follows:

TABLE A

| LAYER FORMULATIONS | | | |
|---|---|---|---|
| Layer | Component | Grams per 4536 grams popcorn | % of popcorn |
| Priming | HPMC 15[1] | 3.300 | 0.07000% |
|  | GPC 790[2] | 7.700 | 0.17000% |
| Ingredient | KALCOGEL F[3] | 0.139 | 0.00306% |
|  | Sodium Citrate | 0.830 | 0.00184% |
|  | Butter Flavor | 51.763 | 1.14117% |
|  | Salt | 14.713 | 0.32437% |
|  | Butter | 12.941 | 0.28529% |
| Sealant | HPMC 5[4] | 11.300 | 0.25000% |

[1]METHOCEL E15 Premium LV Hydroxypropyl Methlcellulose Manufactured by The DOW Chemical Company of Midland, Michigan
[2]PURE-COTE B790 Corn Starch manufactured by Grain Processing Corporation of Muscatine, Iowa
[3]KELCOGEL F Gellen Gum from CP KELCO Corporation
[4]METHOCEL E15 Premium LV Hydroxypropyl Methlcellulose Manufactured by The DOW Chemical Company of Midland, Michigan After popping, the blow-off of the coatings were determined to evaluate final yield on the popcorn as it would be when consumed, each sample was popped, and the amount of post-popped flaking was measured. The term "post-popped flaking" refers to the amount of layer loss which occurs during popping and not during pre-popped handling.

In each instance, for the post-popped flaking, the sample was popped in a Menumaster microwave oven. The contents of the bag were poured into a 20-mesh sieve and shaken for 5 seconds. The popped popcorn was discarded, the remaining debris within the microwave bag and in the pan were examined to remove blow-off material and not popcorn hull material or unpopped kernels. The blow-off was collected and weighed.

TABLE B

| PRIMING LAYER + INGREDIENT LAYER | | | |
|---|---|---|---|
| Variable | Microwave | Blow-off (g) | Time |
| Priming Layer & | 1142 | 0.0121 | 1:40 |
| Ingredient Layer | 1142 | 0.0260 | 1:41 |
|  | 1142 | 0.0192 | 1:38 |
|  | 1142 | 0.0028 | 1:40 |
|  | 1142 | 0.0036 | 1:30 |
|  | Average | 0.01274 | 1:37 |
|  | 1254 | 0.0040 | 1:59 |
|  | 1254 | 0.0147 | 2:06 |
|  | 1254 | 0.0228 | 2:05 |

TABLE B-continued

| PRIMING LAYER + INGREDIENT LAYER | | | |
|---|---|---|---|
| Variable | Microwave | Blow-off (g) | Time |
|  | 1254 | 0.0037 | 2:10 |
|  | 1254 | 0.0032 | 2:10 |
|  | Average | 0.0097 | 2:06 |
|  | 1370 | 0.0044 | 1:50 |
|  | 1370 | 0.0225 | 1:57 |
|  | 1370 | 0.0187 | 1:45 |
|  | Average | 0.0152 | 1:50 |
|  | TOTAL AVG | 0.0121 | 1:53 |

TABLE C

| INGREDIENT LAYER + SEALANT LAYER | | | |
|---|---|---|---|
| Variable | Microwave | Blow-off (g) | Time |
| Ingredient Layer | 1142 | 0.0028 | 1:41 |
| & Sealant Layer | 1142 | 0.0000 | 1:43 |
|  | 1142 | 0.0000 | 1:40 |
|  | 1142 | 0.0000 | 1:36 |
|  | Average | 0.0007 | 1:40 |
|  | 1254 | 0.0085 | 2:04 |
|  | 1254 | 0.0000 | 2:04 |
|  | 1254 | 0.0003 | 2:05 |
|  | 1254 | 0.0000 | 2:02 |
|  | Average | 0.0022 | 2:03 |
|  | 1370 | 0.0029 | 1:47 |
|  | 1370 | 0.0000 | 1:45 |
|  | Average | 0.0015 | 1:46 |
|  | TOTAL AVG | 0.0015 | 1:52 |

TABLE D

| PRIMING LAYER + SEALANT LAYER | | | |
|---|---|---|---|
| Variable | Microwave | Blow-off (g) | Time |
| Priming Layer & | 1142 | 0.0014 | 1:40 |
| Sealant Layer | 1142 | 0.0000 | 1:40 |
|  | 1142 | 0.0001 | 1:45 |
|  | 1142 | 0.0017 | 1:40 |
|  | Average | 0.0008 | 1:41 |
|  | 1254 | 0.0008 | 2:00 |
|  | 1254 | 0.0000 | 2:00 |
|  | 1254 | 0.0008 | 2:00 |
|  | 1254 | 0.0015 | 2:00 |
|  | Average | 0.0008 | 2:00 |
|  | 1370 | 0.0001 | 1:56 |
|  | 1370 | 0.0000 | 2:00 |
|  | Average | 0.0001 | 1:58 |
|  | TOTAL AVG | 0.0006 | 1:56 |

As indicated above, each combination of layers result in very little blow-off. When TABLE B is compared to TABLE C and TABLE D, there is around a tenfold decrease in blow-off when the sealant layer is present in the system.

The ingredient deliver system was also compared to a prior coating. As indicated herein, the prior coating is a single layer dry application coating. The samples for the ingredient delivery system were formed as indicated above in association with TABLE A. The samples for the prior coating were formed according to the following formulation:

TABLE E

PRIOR COATING FORMULATION

| Coating | Component | Pounds per 600 pounds popcorn | % of popcorn |
|---|---|---|---|
| Coating | Butter Flavor | 6.7500 | 1.07300% |
| | Salt | 22.5000 | 3.57500% |
| | Gum[1] | 0.0275 | 0.00400% |
| | Sodium Citrate | 0.0929 | 0.01500% |

[1]KELCOGEL F Gellen Gum from CP KELCO Corporation

TABLE F

PRIOR COATING

| Variable | Microwave | Blow-off (g) | Time |
|---|---|---|---|
| Prior coating | 1054 | 1.0 | 1:52 |
| | 1054 | 1.0 | 2:00 |
| | 1054 | 0.5 | 2:00 |
| | 1054 | 0.9 | 2:03 |
| | 1054 | 1.0 | 2:10 |
| | Average | 0.9 | 2:01 |
| | 1109 | 1.1 | 1:30 |
| | 1109 | 1.0 | 1:30 |
| | 1109 | 1.0 | 1:30 |
| | 1109 | 0.9 | 1:30 |
| | 1109 | 1.0 | 1:30 |
| | Average | 1.0 | 1:30 |
| | 1142 | 1.0 | 1:45 |
| | 1142 | 1.0 | 1:42 |
| | 1142 | 0.9 | 1:40 |
| | 1142 | 1.0 | 1:40 |
| | Average | 1.0 | 1:41 |
| | 1254 | 1.3 | 2:10 |
| | 1254 | 1.3 | 1:06 |
| | 1254 | 1.0 | 2:10 |
| | Average | 1.2 | 1:48 |
| | 1370 | 1.1 | 1:52 |
| | 1370 | 1.1 | 1:45 |
| | 1370 | 1.1 | 1:50 |
| | Average | 1.1 | 1:49 |
| AVERAGE | | 1.0 | 1:46 |

TABLE G

CURRENT INGREDIENT DELIVERY SYSTEM

| Variable | Microwave | Blow-off (g) | Time |
|---|---|---|---|
| | 1142 | 0.0060 | 1:35 |
| | 1142 | 0.0046 | 1:44 |
| | 1142 | 0.0019 | 1:45 |
| | Average | 0.0042 | 1:41 |
| | 1254 | 0.0069 | 2:17 |
| | 1254 | 0.0038 | 2:00 |
| | 1254 | 0.0025 | 2:00 |
| | Average | 0.0044 | 2:05 |
| | 1370 | 0.0030 | 1:55 |
| | 1370 | 0.0066 | 1:55 |
| | Average | 0.0048 | 1:55 |
| AVERAGE | | 0.0044 | 1:50 |

As indicated above when comparing TABLE F to TABLE G, a significant reduction in blow-off is achieved by the ingredient delivery system. The prior coating included an average of 1.0 grams of blow-off. The ingredient delivery system included around 0.0044 grams. The current ingredient delivery system blow off is approximately 0.5% of the prior coating. As indicated above, the blow-off of the current ingredient delivery system is less than 1.0 g. By total weight of the popcorn kernels, the blow-off is less than about 0.005%, 0.006%, 0.007%, 0.008%, 0.009%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, and 1.5%

2. Pop Volume

The ingredient delivery system was also compared to a prior coating to determine differences in pop volume. The samples for the ingredient delivery system and the prior coating samples were formed according to the formulations as indicated above while using the same raw material lot of popcorn. After popping, the pop volume of the samples was determined by dispensing the popped product into a 4000-ml graduated cylinder and gently shaking to level.

TABLE H

INGREDIENT DELIVERY SYSTEM

| Variable | | Wattage | Pop Time | Popped Wt (g) | Pop Volume | Unpopped Wt (g) |
|---|---|---|---|---|---|---|
| SP BUTTER | Ingredient Delivery System | 1109 | 1:38 | 59.7 | 3350 | 3.9 |
| | | 1109 | 1:37 | 60.5 | 3350 | 3.4 |
| | | 1109 | 1:38 | 60 | 3300 | 4.1 |
| | | 1109 | 1:40 | 60.6 | 3500 | 2.9 |
| | | 1109 | 1:45 | 61.7 | 3350 | 2 |
| | | 1109 | 1:45 | 60.9 | 3600 | 2.3 |
| | | 1109 | 1:42 | 61.8 | 3400 | 1.1 |
| | | 1109 | 1:35 | 61 | 3500 | 2.2 |
| | | 1109 | 1:35 | 60.1 | 3450 | 4 |
| | | 1109 | 1:40 | 61.1 | 3250 | 2.6 |
| | 1109 AVERAGE | | 1:39 | 60.7 | 3405 | 2.9 |
| | | 1054 | 2:03 | 60 | 3250 | 4.1 |
| | | 1054 | 2:06 | 58.1 | 3250 | 6.6 |
| | | 1054 | 2:10 | 55.7 | 3200 | 9.1 |
| | | 1054 | 2:10 | 60 | 3250 | 4.5 |
| | | 1054 | 2:20 | 59.5 | 3200 | 5 |
| | | 1054 | 2:20 | 60.1 | 3050 | 4.5 |
| | | 1054 | 2:05 | 60.1 | 3200 | 5.7 |
| | | 1054 | 2:25 | 59.4 | 3200 | 5.7 |
| | | 1054 | 2:30 | 61.5 | 3450 | 2.3 |
| | | 1054 | 2:30 | 61.5 | 3300 | 2.3 |
| | 1054 AVERAGE | | 2:15 | 59.6 | 3235 | 5.0 |
| | TOTAL AVERAGE | | 1:57 | 60.2 | 3320 | 3.9 |

TABLE I

PRIOR COATING

| Variable | | Wattage | Pop Time | Popped Wt (g) | Pop Volume | Unpopped Wt (g) |
|---|---|---|---|---|---|---|
| SP BUTTER | Prior Coating | 1109 | 1:35 | 62.86 | 3100 | 1.7 |
| | | 1109 | 1:32 | 60.1 | 3100 | 3.7 |
| | | 1109 | 1:28 | 60 | 3150 | 4 |
| | | 1109 | 1:35 | 61.9 | 3300 | 1.7 |
| | | 1109 | 1:40 | 61.4 | 3200 | 1.9 |
| | | 1109 | 1:38 | 61.2 | 3100 | 2.4 |
| | | 1109 | 1:32 | 60.8 | 3000 | 3.1 |
| | | 1109 | 1:35 | 61.6 | 3250 | 2.2 |
| | | 1109 | 1:36 | 61.6 | 3350 | 1.4 |
| | | 1109 | 1:40 | 61.4 | 3300 | 2.4 |
| | 1109 AVERAGE | | 1:35 | 61.3 | 3185 | 2.5 |
| | | 1054 | 1:49 | 61.1 | 3100 | 4.6 |
| | | 1054 | 2:00 | 61.6 | 3100 | 2.4 |
| | | 1054 | 2:00 | 57.6 | 2950 | 7.4 |
| | | 1054 | 2:10 | 61.9 | 3100 | 4.2 |
| | | 1054 | 2:10 | 58.6 | 3050 | 6.1 |
| | | 1054 | 2:20 | 59.05 | 2950 | 5.3 |
| | | 1054 | 2:10 | 55.6 | 2900 | 9.3 |
| | | 1054 | 2:07 | 57.7 | 2750 | 7.5 |
| | | 1054 | 2:20 | 58.5 | 3150 | 6.4 |
| | | 1054 | 2:26 | 62.4 | 3200 | 1.7 |

TABLE I-continued

| | | PRIOR COATING | | | |
|---|---|---|---|---|---|
| Variable | Wattage | Pop Time | Popped Wt (g) | Pop Volume | Unpopped Wt (g) |
| 1054 AVERAGE | | 2:09 | 59.4 | 3025 | 5.5 |
| TOTAL AVERAGE | | 1:52 | 60.3 | 3105 | 4.0 |

As indicated above, when comparing TABLE H to TABLE I, a significant increase in pop volume is achieved by the ingredient delivery system. The prior coating included an average volume of 3105 cubic centimeters. The ingredient delivery system included an average volume of 3320 cubic centimeters. Accordingly, the ingredient delivery system provides 215 cubic centimeters more popcorn as compared to the prior coating. Stated another way, for samples of approximately 76.2 grams of unpopped popcorn, the resulting increase in pop volume is approximately 1 cup.

4. Coefficient of Friction and Angle of Repose

Kernels having the prior coating and kernels having the ingredient delivery system were formulated according to the formulations above. The angle of friction is the point at which a particle will slide at a given angle as measured from horizontal. The coefficient of friction can then be determined by calculating the tangent of the angle. A kernel having the prior coating and a kernel having the ingredient delivery system were placed side by side in an all-clad 10" diameter pan mounted on a rotating base with an angle finder. The two kernels were chosen to have approximately the same shape and size. The two kernels were also oriented in the same direction with the germ facing uphill for each run. The pan was first tipped so that the left hand side is raised. The angle was read for each kernel of corn for when they first began to slide. Then the pan was tipped in the opposite direction with each kernel traveling along the same path in the opposite direction. After the second tip, the kernel positions were swapped and the method was repeated for the two additional tips. As indicated below, a total of four (4) tippings per kernel combination were recorded.

TABLE J

| | | COEFFICIENT OF FRICTION | | | | | |
|---|---|---|---|---|---|---|---|
| | | | Prior Coating | | Ingredient Delivery System | | |
| Kernel Set | Direction | Placement | Slide Angle | Coefficient of Friction | Placement | Slide Angle | Coefficient of Friction | Ratio |
| 1 | 1 | 1 | 33 | 0.65 | 2 | 19 | 0.34 | 1.89 |
| 1 | 2 | 1 | 31 | 0.6 | 2 | 19 | 0.34 | 1.75 |
| 1 | 1 | 2 | 28 | 0.53 | 1 | 20 | 0.36 | 1.46 |
| 1 | 2 | 2 | 28 | 0.53 | 1 | 19 | 0.34 | 1.54 |
| 2 | 1 | 1 | 27 | 0.51 | 2 | 19 | 0.34 | 1.48 |
| 2 | 2 | 1 | 27 | 0.51 | 2 | 16 | 0.29 | 1.78 |
| 2 | 1 | 2 | 23 | 0.42 | 1 | 18 | 0.32 | 1.31 |
| 2 | 2 | 2 | 22 | 0.4 | 1 | 20 | 0.36 | 1.11 |
| 3 | 1 | 1 | 24 | 0.45 | 2 | 22 | 0.4 | 1.1 |
| 3 | 2 | 1 | 24 | 0.45 | 2 | 24 | 0.45 | 1 |
| 3 | 1 | 2 | 25 | 0.47 | 1 | 24 | 0.45 | 1.05 |
| 3 | 2 | 2 | 28 | 0.53 | 1 | 27 | 0.51 | 1.04 |
| 4 | 1 | 1 | 32 | 0.62 | 2 | 21 | 0.38 | 1.63 |
| 4 | 2 | 1 | 24 | 0.45 | 2 | 18 | 0.32 | 1.37 |
| 4 | 1 | 2 | 30 | 0.58 | 1 | 20 | 0.36 | 1.59 |
| 4 | 2 | 2 | 35 | 0.7 | 1 | 19 | 0.34 | 2.03 |
| 5 | 1 | 1 | 28 | 0.53 | 2 | 24 | 0.45 | 1.19 |
| 5 | 2 | 1 | 24 | 0.45 | 2 | 24 | 0.45 | 1 |
| 5 | 1 | 2 | 24 | 0.45 | 1 | 24 | 0.45 | 1 |
| 5 | 2 | 2 | 29 | 0.55 | 1 | 24 | 0.45 | 1.24 |
| 6 | 1 | 1 | 22 | 0.4 | 2 | 17 | 0.31 | 1.32 |
| 6 | 2 | 1 | 20 | 0.36 | 2 | 16 | 0.29 | 1.27 |
| 6 | 1 | 2 | 24 | 0.45 | 1 | 18 | 0.32 | 1.37 |
| 6 | 2 | 2 | 22 | 0.4 | 1 | 19 | 0.34 | 1.17 |
| 7 | 1 | 1 | 25 | 0.47 | 2 | 19 | 0.34 | 1.35 |
| 7 | 2 | 1 | 22 | 0.4 | 2 | 22 | 0.4 | 1 |
| 7 | 1 | 2 | 21 | 0.38 | 1 | 20 | 0.36 | 1.05 |
| 7 | 2 | 2 | 28 | 0.53 | 1 | 19 | 0.34 | 1.54 |
| 8 | 1 | 1 | 21 | 0.38 | 2 | 21 | 0.38 | 1 |
| 8 | 2 | 1 | 22 | 0.4 | 2 | 21 | 0.38 | 1.05 |
| 8 | 1 | 2 | 24 | 0.45 | 1 | 24 | 0.45 | 1 |
| 8 | 2 | 2 | 21 | 0.38 | 1 | 25 | 0.47 | 0.82 |
| 9 | 1 | 1 | 22 | 0.4 | 2 | 15 | 0.27 | 1.51 |
| 9 | 2 | 1 | 24 | 0.45 | 2 | 19 | 0.34 | 1.29 |
| 9 | 1 | 2 | 20 | 0.36 | 1 | 16 | 0.29 | 1.27 |
| 9 | 2 | 2 | 20 | 0.36 | 1 | 16 | 0.29 | 1.27 |
| 10 | 1 | 1 | 32 | 0.62 | 2 | 24 | 0.45 | 1.4 |
| 10 | 2 | 1 | 31 | 0.6 | 2 | 19 | 0.34 | 1.75 |
| 10 | 1 | 2 | 27 | 0.51 | 1 | 24 | 0.45 | 1.14 |
| 10 | 2 | 2 | 26 | 0.49 | 1 | 21 | 0.38 | 1.27 |
| | Average | | 25.5 | 0.48 | | 20.4 | 0.37 | 1.31 |
| | StD | | 3.96 | 0.09 | | 2.97 | 0.06 | 0.28 |

As indicated above, kernels with the prior coating had a coefficient of friction that ranged from 0.40 to 0.65. The average coefficient of friction for the kernels having the prior coating was 0.48. The kernels with the ingredient delivery system had a coefficient of friction that ranged from 0.27 to 0.51. The average coefficient of friction for the kernels having the ingredient delivery system was 0.37. Kernels with the ingredient delivery system have over a 22% decrease in coefficient of friction in relation to kernels with the prior coating. The angle of repose was also determined for kernels with the prior coating and kernels with the ingredient delivery system. Kernels with the prior coating had an angle of repose of about 27 degrees. Kernels with the ingredient delivery system had an angle of repose of about 24.5 degrees.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A popcorn product, comprising:
a microwave popcorn package having a susceptor associated with the microwave popcorn package;
an oil/fat slurry in the microwave popcorn package;
a charge of popcorn kernels in the microwave popcorn package, wherein the charge of popcorn kernels includes at least a portion of the kernels having an ingredient delivery system formed on the hull of the kernels, wherein the ingredient delivery system includes a plurality of layers comprising:
a priming layer formed from a water based priming solution, wherein the priming layer is located on the surface of the kernels and has a thickness from about 1 μm to about 20 μm and has a surface that is rougher than the surface of the kernels, wherein the priming layer includes a cellulose component and a starch component,
an ingredient layer formed from a water based ingredient solution, wherein the ingredient layer is located on the surface of the priming layer and has a thickness from about 25 μm to about 50 μm, wherein the ingredient layer includes a gum component and an ingredient component, wherein the ingredient component includes at least one member of a group comprising; a flavor component and a color component;
a sealant layer formed from a water based sealant solution, wherein the sealant layer is located on the surface of the ingredient layer and has a thickness from about 10 μm to about 15 μm and has a smooth surface texture similar to the surface of the kernels, wherein the sealant layer includes a cellulose component.

2. The popcorn product of claim 1, wherein the kernels are unpopped kernels.

3. The popcorn product of claim 1, wherein the kernels are popped kernels.

4. The popcorn product of claim 3, further comprising flakings of the ingredient delivery system located in the microwave popcorn package, wherein the flakings of the ingredient delivery system are less than about 1% by total weight of the popcorn kernels.

5. The popcorn product of claim 4, wherein the flakings of the ingredient delivery system are less than about 0.015% by total weight of the popcorn kernels.

6. The popcorn product of claim 1, wherein the cellulose component of the priming layer is hydroxypropylmethylcellulose, wherein the starch is a modified corn starch.

7. The popcorn product of claim 1, wherein the gum component of the ingredient layer is a gellan gum component.

8. The popcorn product of claim 7, wherein the ingredient component further includes at least one member of a group comprising: a nutrient component, a texture component, and an aromatic component.

9. The popcorn product of claim 1, wherein the cellulose component of the sealant layer is hydroxypropylmethylcellulose.

10. The popcorn product of claim 1, wherein the sealant layer further includes an aromatic component.

11. A popcorn product, comprising:
a popcorn kernel;
an ingredient delivery system formed on the kernel, wherein the ingredient delivery system includes a plurality of separately formed, wherein the layers include:
a priming layer, wherein the priming layer is located on the surface of the popcorn kernel, wherein the priming layer includes a carbohydrate polymeric component and has a surface that is rougher than the surface of the kernels;
an ingredient layer located on the surface of the priming layer, wherein the ingredient layer includes a carbohydrate polymeric component and an ingredient component, wherein the ingredient component includes at least one member of a group comprising; a flavor component and a color component;
a sealant layer located on the surface of the ingredient layer, wherein the sealant layer includes a cellulose component and has a smooth surface texture similar to the surface of the kernels.

12. The popcorn product of claim 11, wherein the carbohydrate polymeric component of the priming layer includes a cellulose component and a starch component.

13. The popcorn product of claim 12, wherein the cellulose component is hydroxypropylmethylcellulose and the starch component is modified corn starch.

14. The popcorn product of claim 11, wherein the carbohydrate polymeric component of the ingredient layer includes a gum component and a starch component.

15. The popcorn product of claim 14, wherein the gum component is a gellan gum and the starch component is a modified corn starch.

16. The popcorn product of claim 11, wherein the cellulose component of the sealant layer is hydroxypropylmethylcellulose.

* * * * *